(12) United States Patent
King et al.

(10) Patent No.: US 6,313,787 B1
(45) Date of Patent: Nov. 6, 2001

(54) METHOD AND APPARATUS FOR ASSISTED GPS PROTOCOL

(75) Inventors: Thomas M. King, Tempe; George J. Geier, Scottsdale, both of AZ (US); Yilin Zhao, Northbrook, IL (US); Roger C. Hart, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/438,204

(22) Filed: Nov. 12, 1999

(51) Int. Cl.⁷ ................................ G01S 5/14
(52) U.S. Cl. .................. 342/357.03; 342/357.1
(58) Field of Search .......... 342/357.03, 357.06, 342/357.15, 357.1

(56) References Cited

U.S. PATENT DOCUMENTS

| | | |
|---|---|---|
| 5,148,452 | 9/1992 | Kennedy et al. . |
| 5,175,557 | 12/1992 | King et al. . |
| 5,786,789 | 7/1998 | Janky . |
| 6,064,336 | * 5/2000 | Krasner ................. 342/357.05 |

OTHER PUBLICATIONS

Bloebaum, Scott, "Low COmplexity Assisted GPS Positioning", T1P1.5/98–440, Sep. 1998.*
FCC Acts To Promote Competition and Public Safety in Enhanced Wireless 911 Services, FCC; Sep. 15, 1999.
Zhao, Simplified GPS Assistance Protocol, 71P1.5/99–569.0, Motorola, Sep. 10, 1999.
Zhao, Mobile Phone Location Technologies, Proceedings of Antenna Symposium '99, Motorola, Oct. 1999.

* cited by examiner

Primary Examiner—Gregory C. Issing
(74) Attorney, Agent, or Firm—Daniel R. Collopy; Michael C. Soldner

(57) ABSTRACT

A cellular network protocol which minimizes the required data flow between the cellular infrastructure and each mobile handset supporting a GPS based positioning capability is taught. Four specific innovations are introduced which together minimize the number of bits required to be transferred to each handset: a method for reducing or removing the requirement for GPS ephemeris updates to each mobile; a method for compression of the differential correction broadcast message; a method for controlling the rate at which the network updates each handset's ephemeris based on an ephemeris age limit; and, finally, a method which each mobile can use to determine when an ephemeris update is needed, based on an accuracy prediction and a threshold which is unique to each mobile.

26 Claims, 25 Drawing Sheets

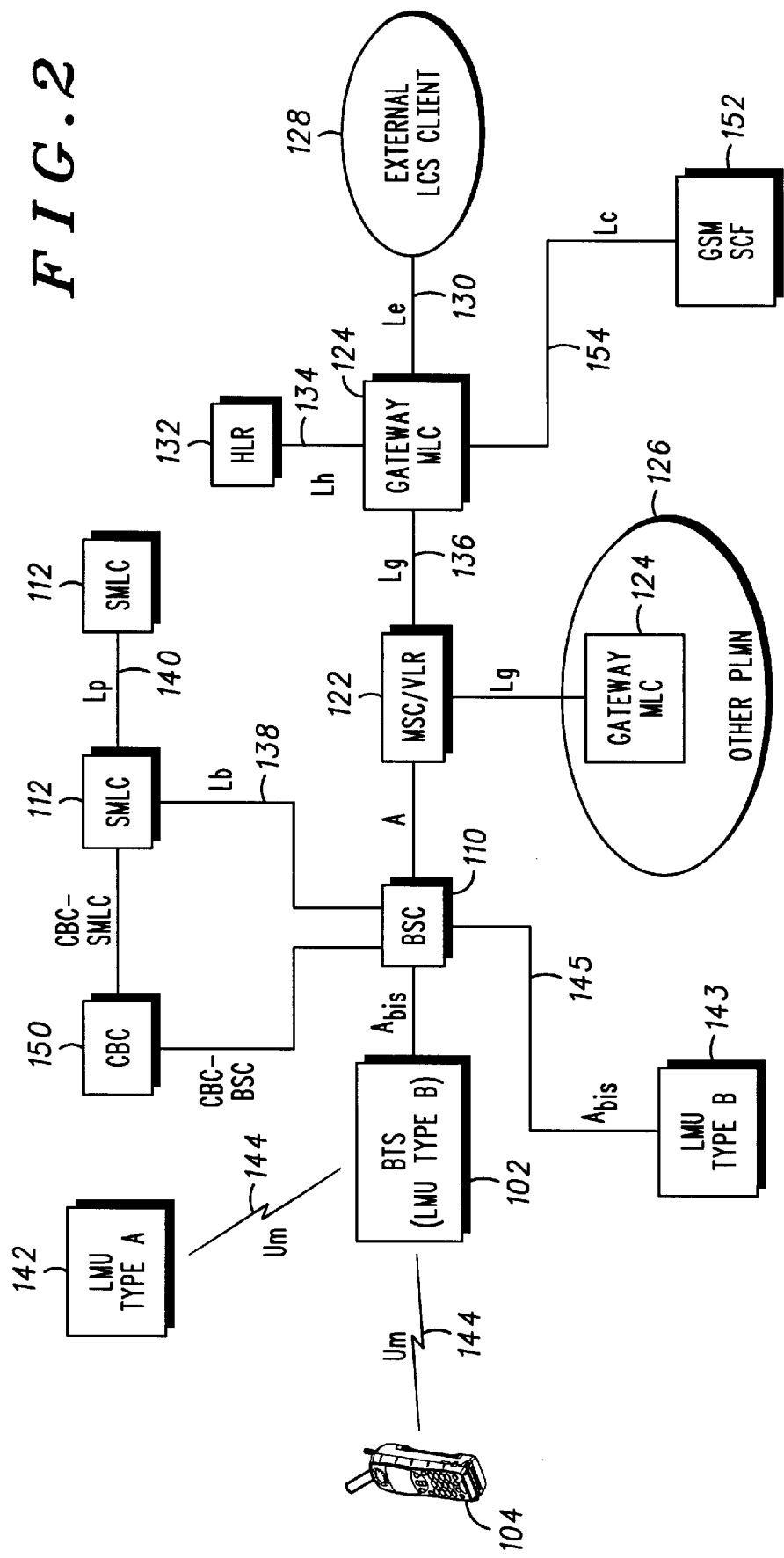

METHOD AND APPARATUS FOR ASSISTED GPS PROTOCOL

FIELD OF THE INVENTION

The present invention relates generally to radio communication systems. More particularly, the present invention relates to a method and an apparatus for a mobile handset location determination protocol in a radio communication system.

BACKGROUND OF THE INVENTION

Radio communication systems generally provide two-way voice and data communication between remote locations. Examples of such systems are cellular and personal communication system (PCS) radio systems, trunked radio systems, dispatch radio networks, and global mobile personal communication systems (GMPCS) such as satellite-based systems. Communication in these systems is conducted according to a pre-defined standard. Mobile stations, also known as handsets, portables or radiotelephones, conform to the system standard to communicate with one or more fixed base stations.

It is desirable to obtain and communicate physical locations of mobile stations within a system, such as radiotelephone handsets within a cellular system. In addition, the United States Federal Communications Commission (FCC) has required that cellular handsets must be geographically locatable by the year 2001. This capability is desirable for emergency systems such as Enhanced 911 (E911). The FCC requires stringent accuracy and availability performance objectives and demands that cellular handsets be locatable within 100 meters 67% of the time for network based solutions and within 50 meters 67% of the time for handset based solutions.

Further, with location information available for mobile stations, position-dependent services and messaging including advertising can be tailored to the handset user responsive to the location of the handset.

Current generations of radio communication have only limited mobile station location determination capability. In one technique, the position of the mobile station is determined by monitoring mobile station transmissions at several base stations. From time of arrival measurements, the mobile station's position can be calculated. However, the precision of this technique is limited and, at times, may be insufficient to meet FCC requirements.

In another technique, each mobile station is equipped with a receiver suitable for use with a global satellite navigation system such as the Global Positioning System (GPS). The construction and operation of receivers suitable for use with GPS are described in U.S. Pat. Nos. 5,175,557 and 5,148,452, both of which are assigned to the assignee of the present invention. The GPS receiver detects transmissions from a constellation of GPS satellites orbiting the Earth. Using data and timing from the transmissions, the GPS receiver calculates the positions of the satellites and from those positions, its own position. A GPS satellite in orbit moves at about 4,000 meters per second. The satellite has location data defined by a parameter X(t) and velocity data defined by a parameter V(t). The parameters X(t) and V(t) are three-dimensional position and velocity vectors for this satellite and are referenced to an earth-centered, earth-fixed Cartesian coordinate system. The GPS system includes 24 satellites, several of which may be in view of the mobile station at any one time. Each satellite broadcasts data according to pre-defined standard formats and timings.

Traditionally, the satellite coordinates and velocity have been computed inside the GPS receiver. The receiver obtains satellite ephemeris and clock correction data by demodulating the satellite broadcast message stream. The satellite transmission contains 576 bits of data transmitted at 50 bits per second (bps). The constants contained in the ephemeris data coincide with Kepler orbit constants requiring many mathematical operations to turn the data into position and velocity data. In one implementation, this conversion requires 90 multiplies, 58 adds and 21 transcendental function calls (sin, cos, tan) in order to translate the ephemeris into a satellite position and velocity vector at a single point, for one satellite. Most of the computations require double precision, floating point processing. A receiver must perform this computation every second for every satellite, for up to twelve satellites.

Thus, the computational load for performing the traditional calculation is significant. The handset must include a high-level processor capable of the necessary calculations. Such processors are relatively expensive and consume large amounts of power. As a portable device for consumer use, a mobile station is preferably inexpensive and operates at very low power. These design goals are inconsistent with the high computational load required for GPS processing.

Further, the slow data rate from the GPS satellites is a limitation. GPS acquisition at a GPS receiver may take many seconds or several minutes, during which time the receiver circuit and processor of the mobile station must be continuously energized. Preferably, to maintain battery life in portable receivers and transceivers such as mobile cellular handsets, circuits are de-energized as much as possible. The long GPS acquisition time can rapidly deplete the battery of a mobile station. In any situation and particularly in emergency situations, the long GPS acquisition time is inconvenient.

One system proposal, termed Assisted GPS, includes receiving the ephemeris and clock correction data at a base station of the radio communication system and transmitting this data over a conventional communication link to the mobile station. The base station receives the 50 bps transmission from a GPS satellite and acts as a repeater, gathering the data from the GPS satellite and re-transmitting it at a higher data rate to a mobile station. The ephemeris and clock correction data are received at the mobile station and used for calculation of satellite position. From satellite position, mobile station position can in turn be determined. While this system has some advantages such as a greater data rate used in the base-to-mobile communication link (typically as high as 9600 bps) to allow the mobile station's receiver circuit to be turned off a greater amount of time, the high computational load associated with the raw ephemeris data remains.

Another proposed solution stores a GPS almanac at the mobile station. The almanac data is a truncated, reduced precision subset of the ephemeris data. A base station computes location and clock correction information for the almanac and transmits this correction over the communication link to the mobile station. The mobile station determines that it has the proper correction data for its almanac and, if so, computes satellite location and clock data using the almanac.

This system reduces slightly the computational load required of the mobile station. However, the mobile station receiver must still remain energized during transmission of its almanac data and subsequently during all possible transmission times to receive correction data for its almanac. Also, the almanac data must be stored at the mobile station, which can increase the size and cost of the mobile station.

Yet another proposed solution is a network-centric approach that places the responsibility of determining when a mobile should be updated in the network. This places a harsh constraint on the end-application, requiring the most stringently applied database update requirements to be applied to all mobiles, as there is no provision by which the mobile can inform the network how to prioritize the database update scheme.

There are three major drawbacks to this proposed solution. First, it has not been proven that the dynamic range of the incremental update fields will be sufficient to cover all possible values of the parameters. Given the complex nature of the incremental update algorithms, using several weeks of ephemeris data may not sufficiently cover all possibilities, such as satellite station-keeping maneuvers or satellite orbit changes that are periodically performed by the GPS ground control segment. In the past, several GPS satellites were repositioned to higher orbits for weeks at a time in order to place these particular satellites into a different part of the orbit plane. The satellites were active during the entire re-orbit phase, except for short periods before and after the acceleration and braking events.

Second, a new parameter, Issue of Data Assistance (IODA), must be created and used for every sampling of the visible satellites in every fifteen minutes, and complicated intra- and inter-tables as well as related data structure and algorithms must be created, maintained, communicated at the Serving mobile location Center (SMLC), along with the IODA. In particular, the inter-table maintenance and inter-SMLC communication is difficult and is often viewed as not necessary.

And third, while once the mobile has obtained a raw ephemeris set for a visible satellite, there is not a need to update that ephemeris set in most, if not all, cases, the prior art proposed solution suggests frequently updating the ephemeris data. This occupies considerable portions of the point-to-point transmission channel as shown in Table 1 below:

FIG. 4 is a protocol-level flow diagram of the operation of the Assisted GPS radiotelephone system of FIG. 1.

FIG. 5 is a positioning procedures/data flow diagram of a mobile originating location request operating as point-to-point messaging on the Assisted GPS radiotelephone system of FIG. 1 in accordance with the preferred embodiment of the present invention.

FIG. 6 is a positioning procedures/data flow diagram of a mobile terminating location request operating as point-to-point messaging on the Assisted GPS radiotelephone system of FIG. 1 in accordance with the preferred embodiment of the present invention.

FIG. 7 is a data flow diagram of GPS broadcast messaging on the Assisted GPS radiotelephone system of FIG. 1 in accordance with the preferred embodiment of the present invention.

FIG. 8 is a block diagram of a cellular mobile station in accordance with the preferred embodiment of the present invention.

FIGS. 9A and 9B are a flowchart of the operation of the handset of FIG. 8 for request/receive and point-to-point delivery of ephemeris and differential correction data in accordance with the preferred embodiment of the present invention.

FIGS. 10A and 10B are a flowchart of the operation of the handset of FIG. 8 for request/receive and broadcast delivery of ephemeris and point-to-point delivery of differential correction data in accordance with the preferred embodiment of the present invention.

FIGS. 11A and 11B are a flowchart of the operation of the handset of FIG. 8 for request/receive and point-to-point delivery of ephemeris and broadcast delivery of differential correction data in accordance with the preferred embodiment of the present invention.

FIGS. 12A and 12B are a flowchart of the operation of the handset of FIG. 8 for request/receive and broadcast delivery of ephemeris and differential correction data in accordance with the preferred embodiment of the present invention.

TABLE 1

Total Bits Delivered for the Prior Art to the MS per Visible Satellite

| Latitude | % SV's with Raw EPH Update | % SV's with 2 hr Increm EPH Update | % SV's with 4 hr Increm EPH Update | % SV's with 6 hr Increm EPH Update | % SV's with 8 hr Increm EPH Update | Total Raw Equiv Updates per SV |
|---|---|---|---|---|---|---|
| 60 Deg | 100% | 85% | 50% | None | None | 1.68 × Raw EPH Bits |
| 30 Deg | 100% | 90% | 70% | 30% | None | 1.95 × Raw EPH Bits |
| 15 Deg | 100% | 95% | 80% | 30% | 15% | 2.10 × Raw EPH Bits |
| Equator | 100% | 97% | 85% | 65% | 35% | 2.41 × Raw EPH Bits |

Accordingly, there is a need for an improved method and apparatus to support location determination in a radio communication system.

BRIEF DESCRIPTION OF THE DRAWINGS

FIG. 2 is a block diagram of a cellular radiotelephone system architecture capable of supporting Location Services (LCS) in accordance with the preferred embodiment of the Assisted GPS radiotelephone system of FIG. 1.

DETAILED DESCRIPTION OF THE INVENTION

An improved system and method of Assisted GPS receiver location determination is described. The system of the present invention includes a novel mobile station architecture which can determine its location with a high degree of accuracy while achieving low power consumption and low cost objectives. This allows for energy conservation— an important feature in portable devices, and makes E911 service viable in a portable product.

Figure 1:
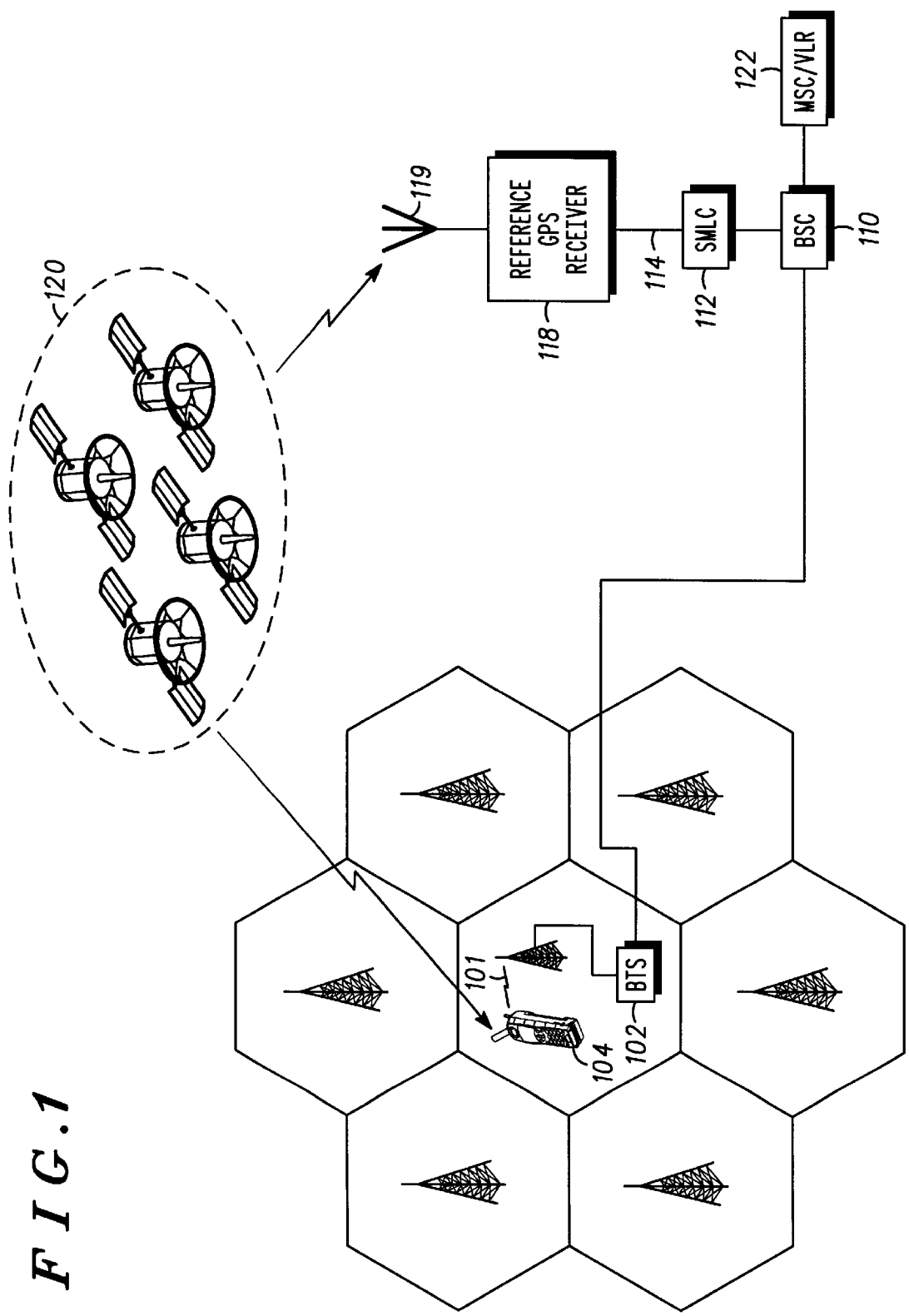
FIG. 1 is a system diagram of an Assisted Global Positioning System (GPS) cellular radiotelephone system in accordance with a preferred embodiment of the present invention.

Referring to FIG. 1, a GSM cellular network is depicted utilizing the system diagram of an Assisted GPS location system in accordance with the preferred embodiment of the present invention. This is a system with a Base Station Subsystem (BSS)—based Serving Mobile Location Center (SMLC) 112. The GPS reference receiver 118 is located at a surveyed location with SMLC 112 and has an open view of the sky in order to facilitate generation of appropriate corrections. Optionally, as one skilled in the art would recognize, the GPS reference receiver 118 could be located at any surveyed location with an open view of the sky so long as it can be coupled via serial link 114 to the network or co-located with another network node. SMLC 112 is coupled to Base Transceiver Station (BTS) 102 via Base Station Controller (BSC) 110. The BSC 110 is also coupled to a Mobile services Switching Center (MSC) and Visitor Location Register (VLR) 122 in a manner well known in the art.

The GPS reference receiver 118 receives and tracks signals from multiple GPS satellites 120 in order to generate the differential correction data which is eventually sent to location-capable mobile stations (handsets) 104. The differential correction data which is generated by the GPS reference receiver 118 is preferably generated for all GPS satellites 120 within view of the GPS reference receiver antenna 119, to maximize the mobile handset coverage.

In addition to transmitting the differential correction data to the SMLC 112, the ephemeris and clock correction data (collectively referred to hereinafter as "ephemeris data") which is collected from each satellite is similarly transmitted. The SMLC 112 collects the ephemeris and differential correction data and prepares separate messages to be modulated on the cellular carrier signal 101 and sent to multiple users 104. The specific message formats vary as a function of the transmission mode. The message structures for both "point-to-point" and "broadcast" (or "point-to-multipoint") modes of operation are described in detail later in the text.

Recent cellular systems include location service (LCS) and related technologies, and many architectures, protocols and procedures are still in development, such as logical LCS architecture, signaling protocol and interfaces, network location procedures and positioning procedures. Accordingly, while a GSM cellular network having LCS and related technologies as described in GSM Standard 03.71 (Functional Description) has been presented hereinabove, the Assisted GPS protocol of the present invention is flexible enough to be applied to any present and future LCS architecture, protocols and procedures.

Referring next to FIG. 2, an architecture capable of supporting the location service (LCS) is described. The LCS in accordance with the preferred embodiment of the present invention is logically implemented on the GSM structure through the addition of one network node, the Mobile Location Center (MLC). A generic BSS based SMLC 112 is shown in this figure. This architecture can be combined to produce LCS architecture variants.

The Base Station System (BSS) is involved in the handling of various positioning procedures. Specific BSS functionality is specified in each of the positioning procedures section.

The Gateway Mobile Location Center (GMLC) 124 contains functionality required to support LCS. In one Public Land Mobile Network (PLMN) 126, there may be more than one GMLC 124. The GMLC 124 is the first node an external LCS client 128 accesses in a GSM PLMN, i.e. the Le (interface between External User and MLC) 130 reference point is supported by the GMLC 124. An external LCS client 128 could is an entity requesting identification of a location of a particular mobile station (MS) 104 or particular mobile stations 104. The GMLC 124 may request routing information from a Home Location Register (HLR) 132 via the Lh interface (between MLC and HLR) 134. After performing registration authorization, it sends positioning requests to and receives final location estimates from the MSC/VLR 122 via the Lg interface (between GMLC and MSC/VLR) 136.

The Serving Mobile Location Center (SMLC) 112 contains functionality required to support LCS. In one PLMN, there may be more than one SMLC 112. The SMLC 112 manages the overall coordination and scheduling of resources required to perform positioning of a mobile. It also calculates the final location estimate and accuracy. Two types of SMLC 112 are possible. An SMLC 112 in accordance with the preferred embodiment of the present invention is a BSS based SMLC: supports the Lb interface 138 between the SMLC 112 and the Base Station Controller (BSC) 110. A NSS based SMLC which supports an Ls interface between the SMLC and the MSC/VLR is depicted and described hereinbelow in connection with an alternate embodiment of the present invention.

A BSS based SMLC 112 supports positioning via signaling on the Lb interface 138 to the BSC 110 serving the target MS 104. Both types of SMLC 112 may support the Lp interface 140 to enable access to information and resources owned by another SMLC 112. The SMLC 112 controls a number of Location Measurement Units (LMUs) 142, 143 for the purpose of obtaining radio interface measurements to locate or help locate MS subscribers in the area that it serves. The SMLC 112 is administered with the capabilities and types of measurement produced by each of its LMUs 142, 143. Signaling between a BSS based SMLC 112 and LMU 142, 143 is transferred via the BSC 110 that serves or controls the LMU using the Lb interface 138 and either the Um interface 144 for a Type A LMU 142 or the Abis interface 145 for a Type B LMU 143. The SMLC 112 and GMLC 124 functionality may be combined in the same physical node, combined in existing physical nodes, or reside in different nodes.

For Location Services, when a Cell Broadcast Center (CBC) 150 is associated with a BSC 110, the SMLC 112 may interface to a CBC 150 in order to broadcast assistance data using existing cell broadcast capabilities. The SMLC 112 shall behave as a user, Cell Broadcast Entity, to the CBC 150. The conventional operation of the CBC 150 is described in GSM Standard 03.41. In addition, the MS 104 may be involved in the various positioning procedures.

An LMU 142, 143 makes radio measurements to support one or more positioning methods. These measurements fall into one of two categories: location measurements specific to one MS 104 used to compute the location of that MS 104, and assistance measurements specific to all MSs 104 in a certain geographic area. All location and assistance measurements obtained by an LMU 142, 143 are supplied to a particular SMLC 112 associated with the LMU 142, 143. Instructions concerning the timing, the nature and any periodicity of these measurements are either provided by the SMLC 112 or are pre-administered in the LMU 142, 143. There are two types of LMU, a Type A LMU 142 is an LMU that is accessed over the normal GSM air interface Um 144 and a Type B LMU 143 is an LMU that is accessed over the Abis interface 145.

The MSC 122 contains functionality responsible for mobile station subscription authorization and managing call-related and non-call related positioning requests of GSM LCS. The MSC is accessible to the GMLC 124 via the Lg interface 136.

The HLR 132 contains LCS subscription data and routing information. The HLR 132 is accessible from the GMLC 124 via the Lh interface 134. For roaming MSs 104, the HLR 132 corresponding to that mobile station may be in a different PLMN 126 than the current SMLC 112.

The gsmSCF 152 is a part of the PLMN. The Lc interface 154 supports CAMEL access to LCS and is applicable only in Customized Applications for Mobile Network Enhanced Logic (CAMEL) phase three. The procedures and signaling associated with it are defined in GSM Standards 03.78 and 09.02, respectively.

The LCS architecture is intended to support a high degree of flexibility, whereby any physical SMLC 112 can support multiple Lb interfaces 138 (e.g. allowing a BSS based SMLC 112 to serve multiple BSCs 110) and whereby a mixture of different SMLC 112 types can serve a single network or single MSC area. Of course, a mixture of different SMLC types can also serve a single network or single MSC area.

The system architecture depicted in FIGS. 1 and 2 is a BSS architecture. While the preferred embodiment is described in terms of a BSS architecture, the Assisted GPS protocol of the present invention can be enabled on many other system architectures. One architecture, a Network System Subsystem (NSS) architecture will be described hereinbelow in regards to one alternate embodiment of the present invention.

Figure 3A:
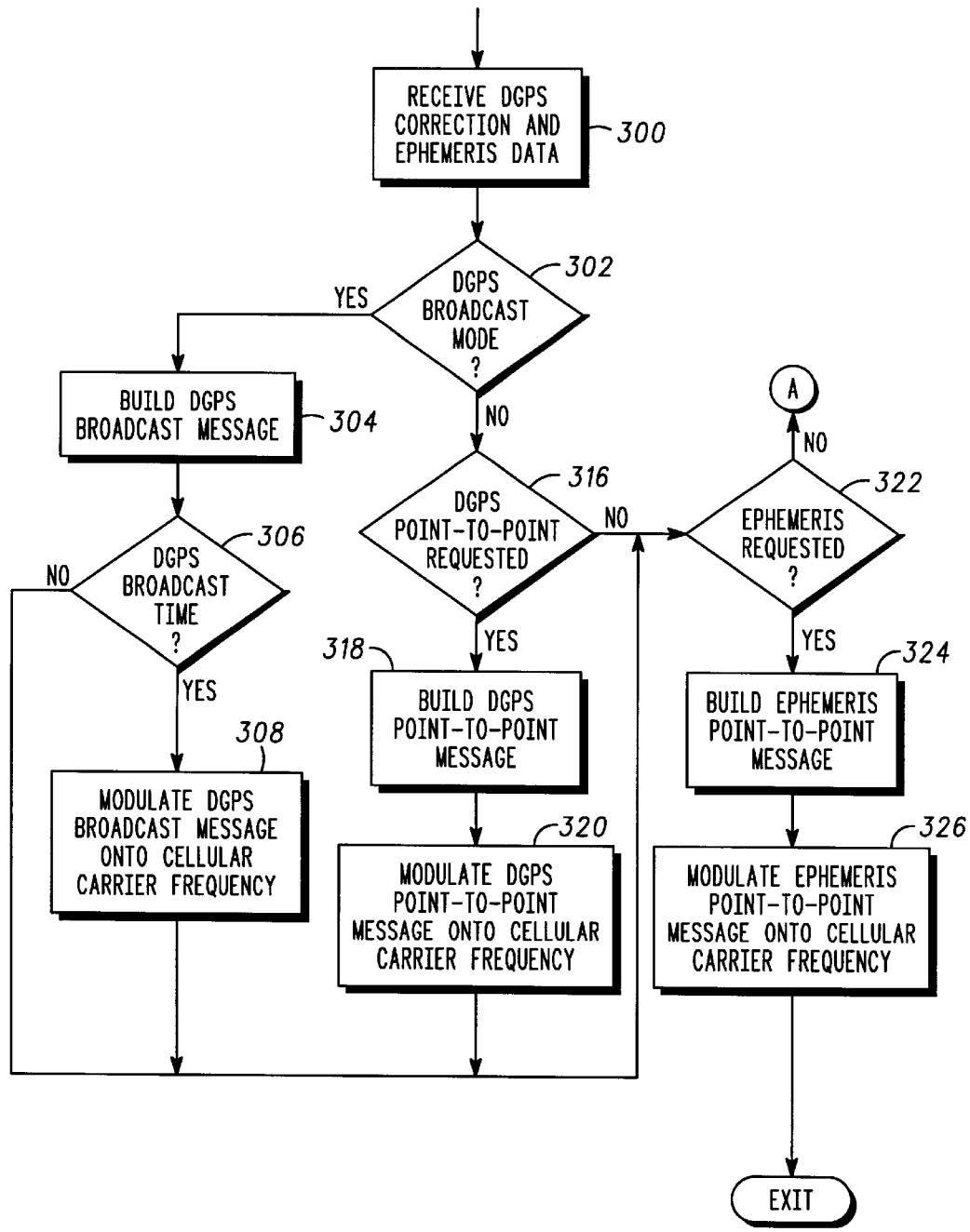
FIGS. 3A and 3B are a flowchart of the operation of the Assisted GPS radiotelephone system of FIG. 1.
Figure 3B:
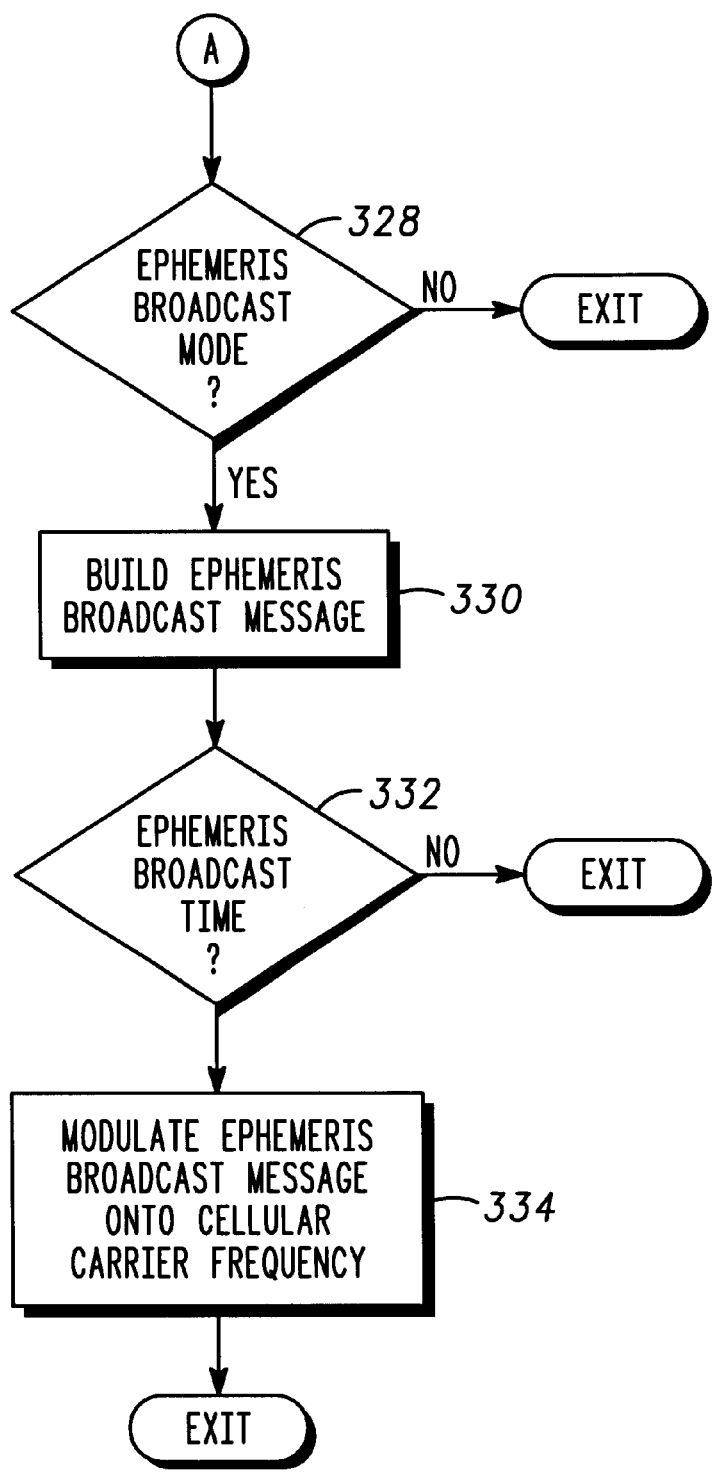

The sequencing of computations and events occurring within the SMLC is illustrated in the flowchart appearing in FIGS. 3A–3B. The process begins with the receipt of differential correction data 300 from the DGPS reference receiver: a serial link is used to transmit the correction data at a nominal output rate (e.g., 0.1–1.0 Hz). Preferably, in accordance with the current invention, the correction data which is generated by the DGPS reference receiver is derived for all sets of ephemeris data (as determined through the Issue Of Data Ephemeris (IODE) word which accompanies each unique ephemeris set. Alternatively, the SMLC itself can perform the necessary calculations if the corrections are computed for only a single IODE. In step 302, a test is made on the current DGPS messaging mode: if the mode is broadcast, the DGPS broadcast message 304 will be built, and if it is determined by the SMLC that it is time to broadcast this message 306, the message will be modulated onto the cellular carrier frequency 308 for eventual broadcast throughout the area served by the network. If, on the other hand, a DGPS point-to point message request has been received 316, this message will be built 318 and modulated onto the cellular carrier frequency for eventual transmission to the handset making the request. Similarly, if a request for a "point-to-point" ephemeris message has been received 322, that message is built 324, and modulated onto the cellular carrier frequency 326 for eventual transmission to the handset requesting the ephemeris data. Finally, if the ephemeris messaging mode is broadcast 328, that message is built in 330, and a test is made to see if it is time to broadcast this message 332. If it is time to broadcast, the message is modulated onto the cellular carrier frequency 334 for eventual transmission throughout the area served by the network. A detailed definition of all the broadcast and point-to-point messages associated with the current invention is provided hereinbelow.

Figure 4:
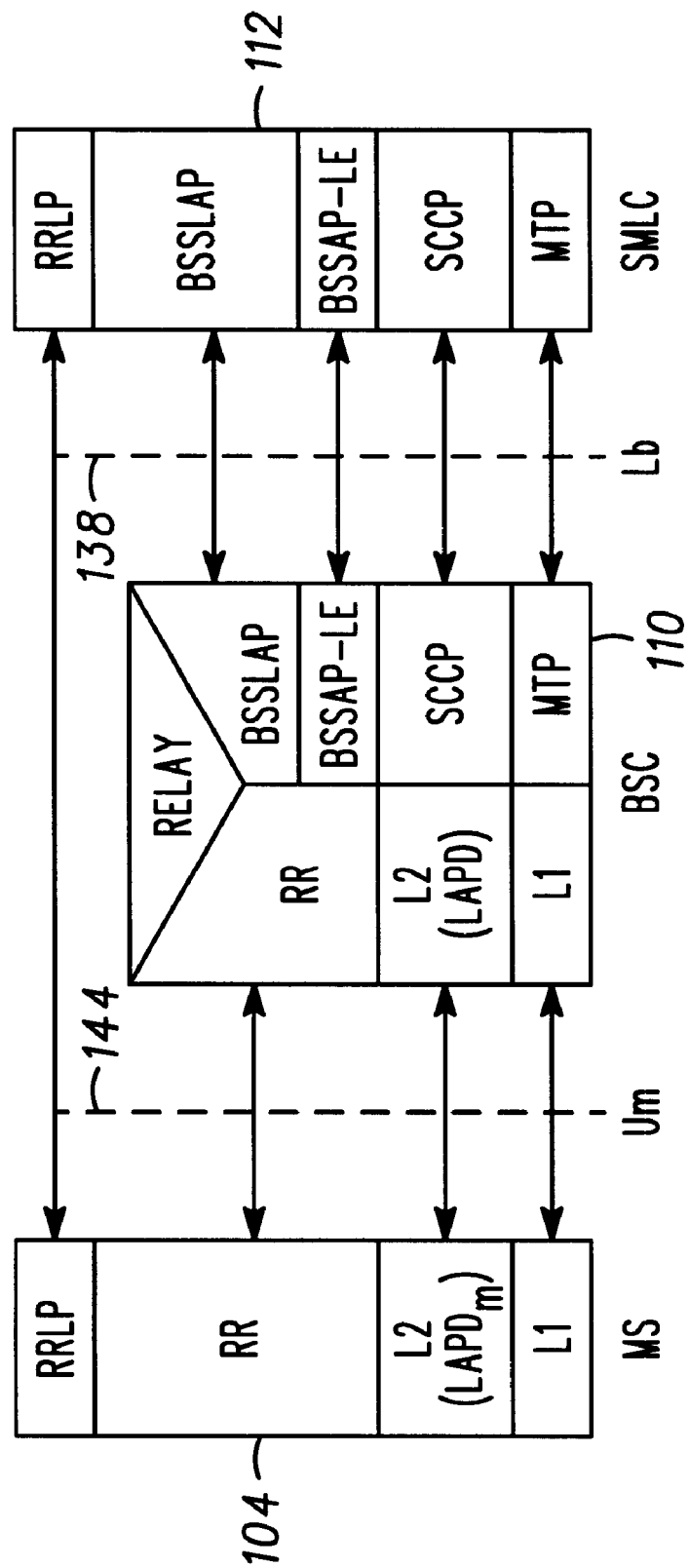

FIG. 4 shows the protocol layers used to support signaling protocols between an SMLC 112 and target MS (mobile station) 104 with a BSS based SMLC 112. Details of signaling between SMLC 112, MSC 122 and BSC 110 are ignored in this depiction.

Many of the protocols depicted in FIG. 4 are protocols typical to a conventional GSM cellular system and are addressed in GSM Standard 01.04. Those protocols new to the location services (LCS) are defined as follows: RR stands for Radio Resource; RRLP stands for a RR LCS Protocol to a target MS; Um is the air interface to an LMU; BSSAP-LE stands for Base Station System Application Part-LCS Extension; BSSLAP stands for Base Station System LCS Assistance Protocol; and Lb 138 stands for an interface between the SMLC and the BSC.

Figure 5:
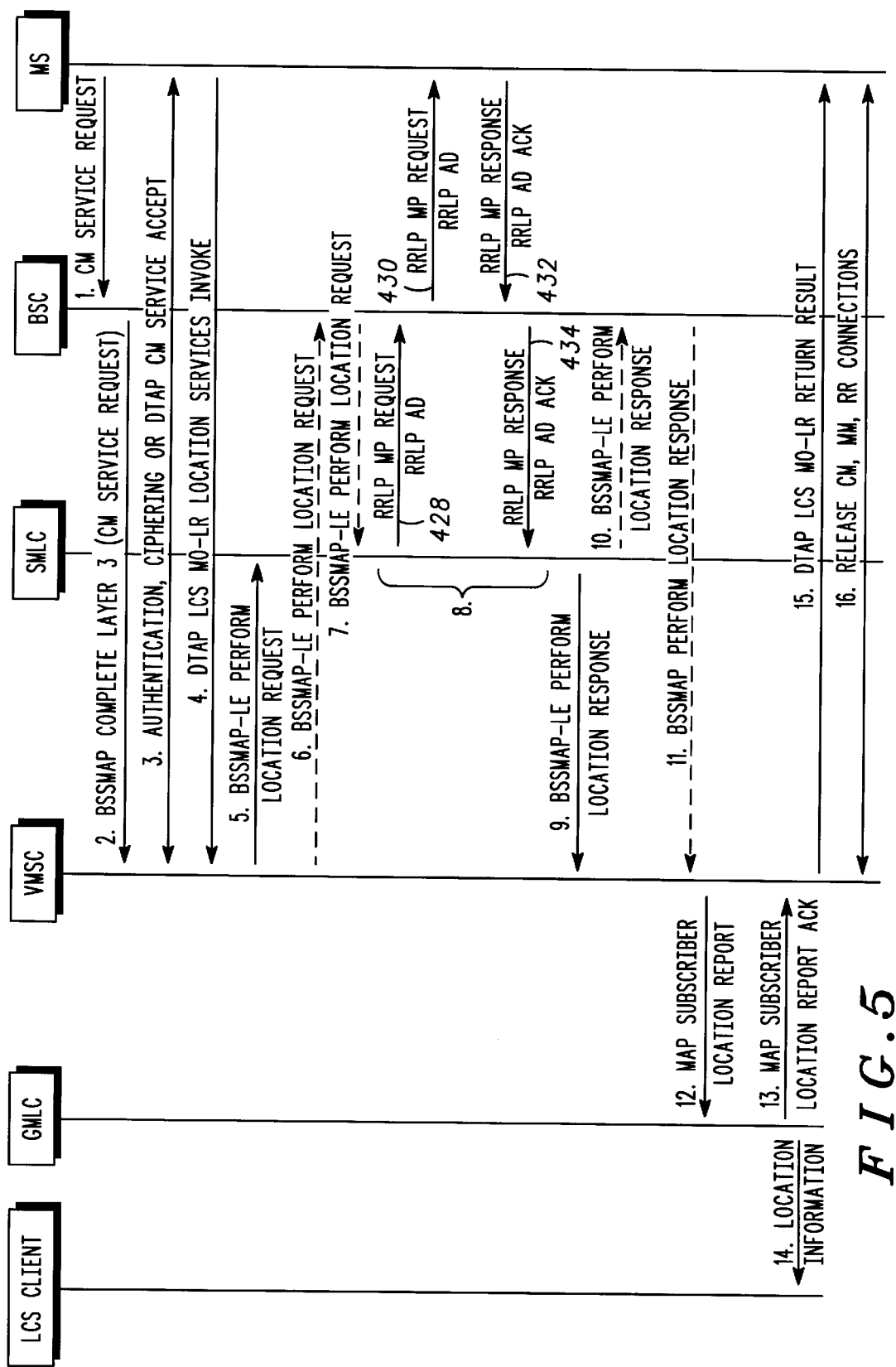

Referring to FIG. 5, a data flow diagram of a mobile originating location request operating as point-to-point messaging on the Assisted GPS radiotelephone system of FIG. 1 in accordance with the preferred embodiment of the present invention is described. The data flow depicted allows a mobile station (MS) to request either its own location, location assistance data or broadcast assistance data message ciphering keys from the network. Location assistance data may be used subsequently by the MS to compute its own location throughout an extended interval using a mobile-based position method. The ciphering key enables the MS to decipher other location assistance data broadcast periodically by the network. The MO-LR (Mobile Originating Location Request) after location update request may be used to request ciphering keys or GPS assistance data using the follow-on procedure described in GSM Standard 04.08. The procedure may also be used to enable an MS to request that its own location be sent to another LCS client. The sixteen steps depicted in FIG. 5, other than step eight are discussed in detail in GSM Standard 03.71 and are well-known to those skilled in the art.

In accordance with the present invention, the main Assisted GPS related data flow is indicated in step eight. This signaling flow would be common to all MS based location methods such as handset-based GPS and handset-assisted GPS. In message 428, the SMLC determines assistance data and sends it in the RRLP ASSISTANCE DATA message to the BSC. In response thereto in message 430, the BSC forwards the assistance data to the MS in a RRLP ASSISTANCE DATA message. If the assistance data does not fit to one message, messages 428 and 430 can be repeated. In message 432, the MS acknowledges the reception of complete assistance data to the BSC with a RRLP ASSISTANCE DATA Acknowledgement (ACK). The BSC forwards the RRLP ASSISTANCE DATA ACK message to the SMLC as message 434.

In addition to the assistance data flow described above, the positioning procedure flow is also indicated in step eight. The positioning procedure flow comprises the steps of the SMLC determines possible assistance data and sends RRLP MEASURE POSITION request to BSC 428, and the BSC sends the positioning request including the QoS and any assistance data to the MS in a RRLP MEASURE POSITION request 430. Provided location privacy is not enabled in the MS, or enabled but overridden to obtain location for an emergency call, the MS performs the requested GPS measurements. If the MS is able to calculate its own location and this is required, the MS computes a GPS location estimate. Any data necessary to perform these operations will be either provided in the RRLP MEASURE POSITION request or available from broadcast sources. The resulting GPS measurements or GPS location estimate are returned to the BSC in a RRLP MEASURE POSITION response 432. If the MS was unable to perform the necessary measurements, or compute a location, a failure indication is returned instead. The BSC sends measurement results in the MEASURE POSITION response within LCS Information Report message to SMLC 434.

Figure 6:
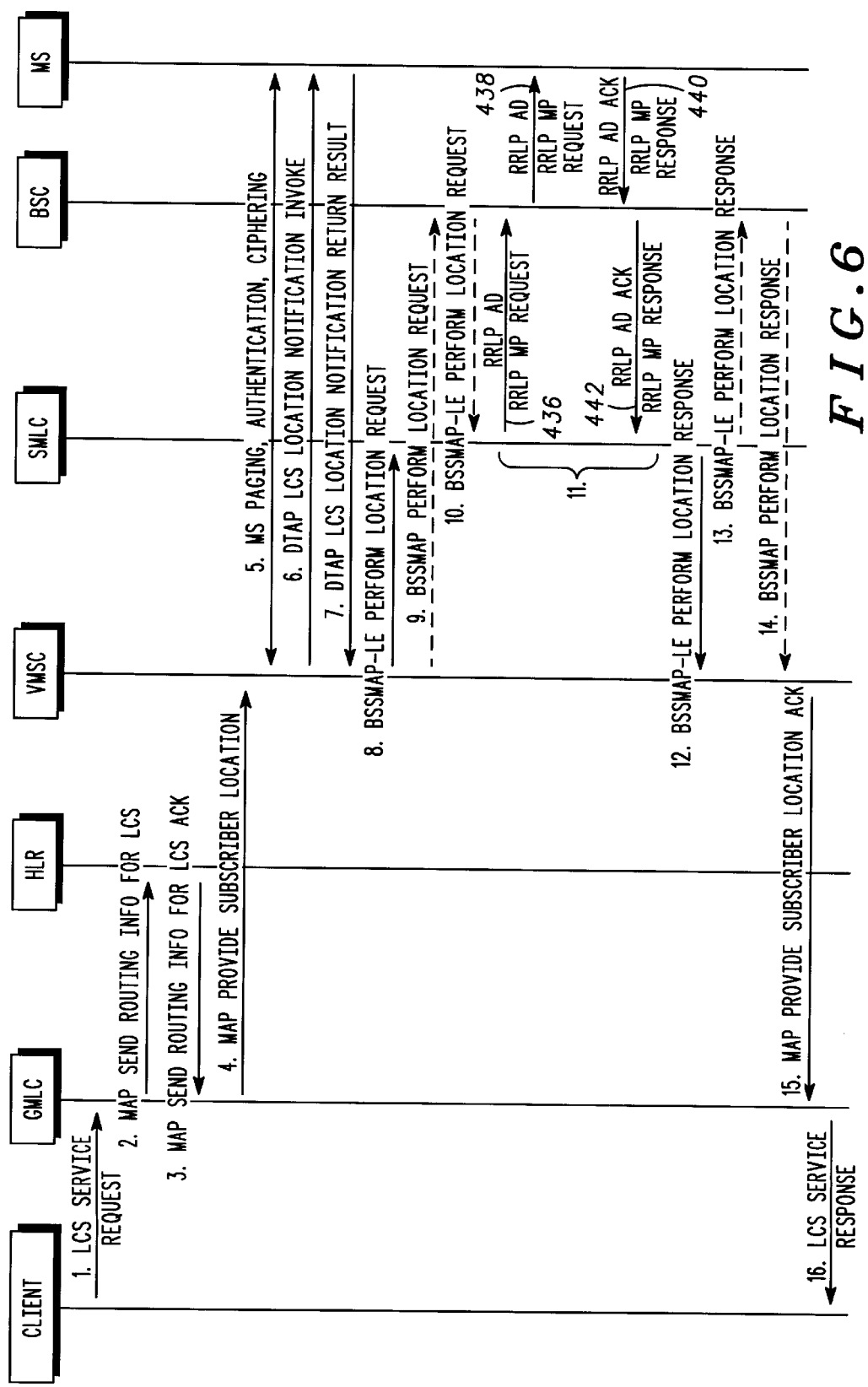

A data flow diagram of a mobile terminating location request operating as point-to-point messaging in an Assisted GPS system in accordance with the preferred embodiment of the present invention is depicted in FIG. 6. This messaging allows an external LCS client, such as an emergency service (ambulance or fire department), to request the current location of a target mobile station. This is termed Mobile Terminating Location Request (MT-LR) and a detailed discussion of the sixteen steps, other than step eleven, can be found in GSM Standard 03.71. When the external LCS client is the North American Emergency Services, an NAES MT-LR is defined to include only steps 1, 4, 8, 12, 15, 16 and, in accordance with the preferred embodiment of the present invention, step 11.

The Assisted GPS positioning and data flow in accordance with the present invention is indicated in step 11. This signaling flow is applicable to all MS based location methods including handset-based and handset-assisted GPS. The assistance data delivery flow ith a BSS based SMLC shown in step eleven 436, 438, 440, 42 is the same as the four steps of step eight in FIG. 5 (i.e., steps 428, 430, 432 and 434). Likewise, the flow has two aspects, assistance data flow and positioning procedure flow, and the positioning procedure flow in step eleven of FIG. 6 is the same as that in step eight of FIG. 5.

Figure 7:
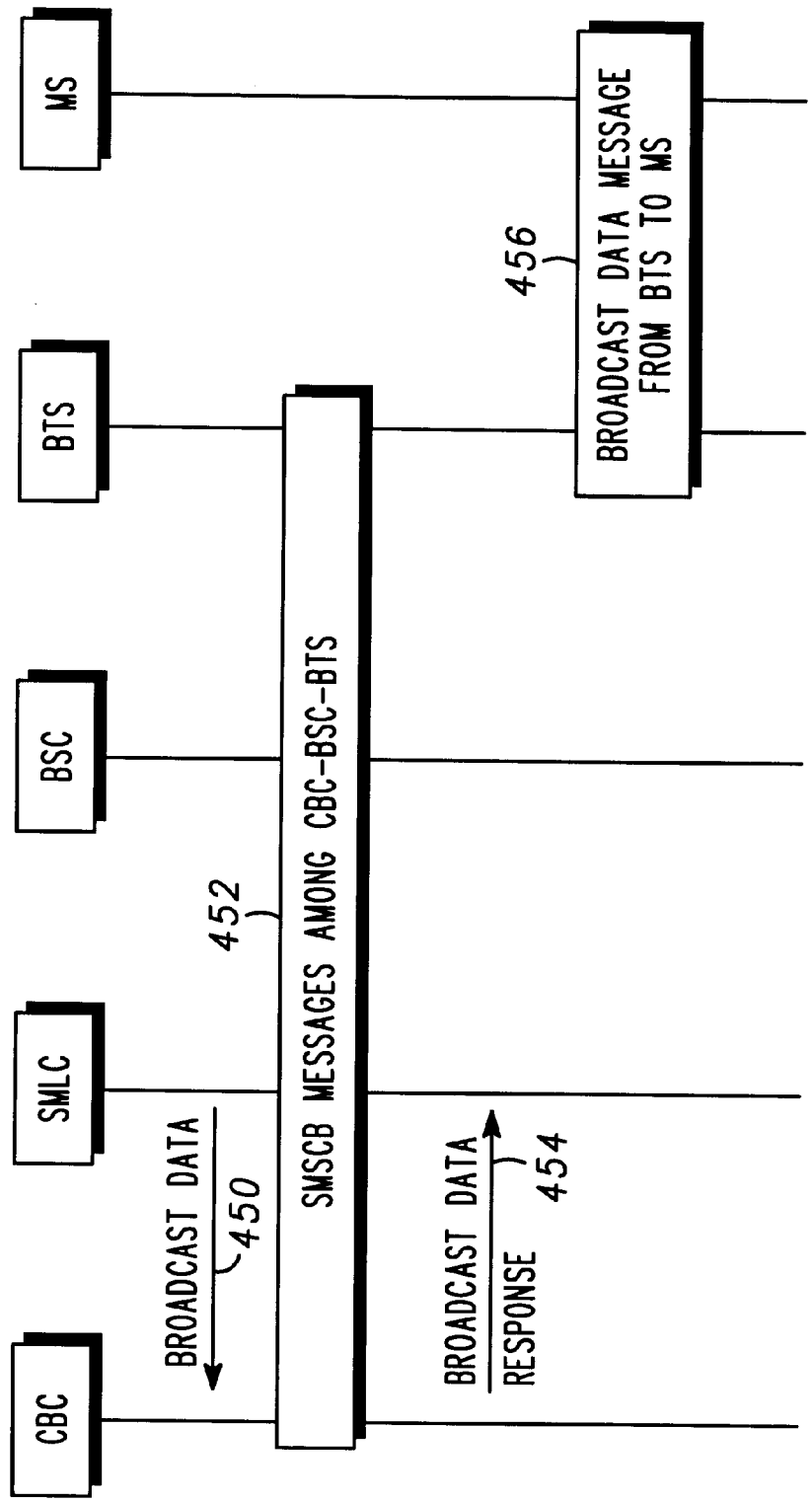

Referring to FIG. 7, the preferred data flow of GPS broadcast messaging in the Assisted GPS system of the present invention is shown. The broadcast messaging as shown in FIG. 7 is also known as point-to-multipoint assistance data broadcast and, as the methods of FIGS. 5 and 6, the signaling flow of FIG. 7 is applicable to all MS based location methods, including handset-based and handset-assisted GPS.

The GPS Assistance Data Broadcast Message is created in the SMLC and the whole message including the ciphered parts and parameters to control the transfer are transferred from the SMLC to the MS. In accordance with the preferred embodiment of the present invention, Short Message Service Cell Broadcast (SMSCB) Discontinuous Receive (DRX) service is used for the LCS assistance data broadcast. Prior to receiving the first schedule message, the MS should read the first block of each message lot to be able to receive the LCS Broadcast Data or the schedule message. After receiving the schedule message, the MS should receive the LCS Broadcast Data messages according to the schedule information. The SMLC then sends the complete broadcast message 450 to the CBC with the LCS Broadcast Data message. This LCS Broadcast Data message contains the data to be broadcast as well as parameters which indicate to which BTS the broadcast message is targeted and what time the broadcast should happen. LCS Broadcast Data message may also contain the SMSCB scheduling information which is broadcast to the MS in order that the MS can utilize the SMSCB DRX feature specified in the specification of the GSM Standard 04.12. SMSCB DRX operation is required in order that MS performance can be optimized.

Next, the CBC starts message transfer to BSC and BTS according to GSM 03.41 as shown in messages 452. Next, a LCS Broadcast Data Response message 454 from the CBC to the SMLC is used to indicate that the LCS Broadcast Data has been delivered and the request has been fulfilled. This message is not mandatory. Then, the BTS starts the message transfer 456 to the MS in accordance with GSM Standard 03.41. Other implementations that have an SMLC and/or a CBC integrated into a BSC may use other message signaling.

Figure 8:
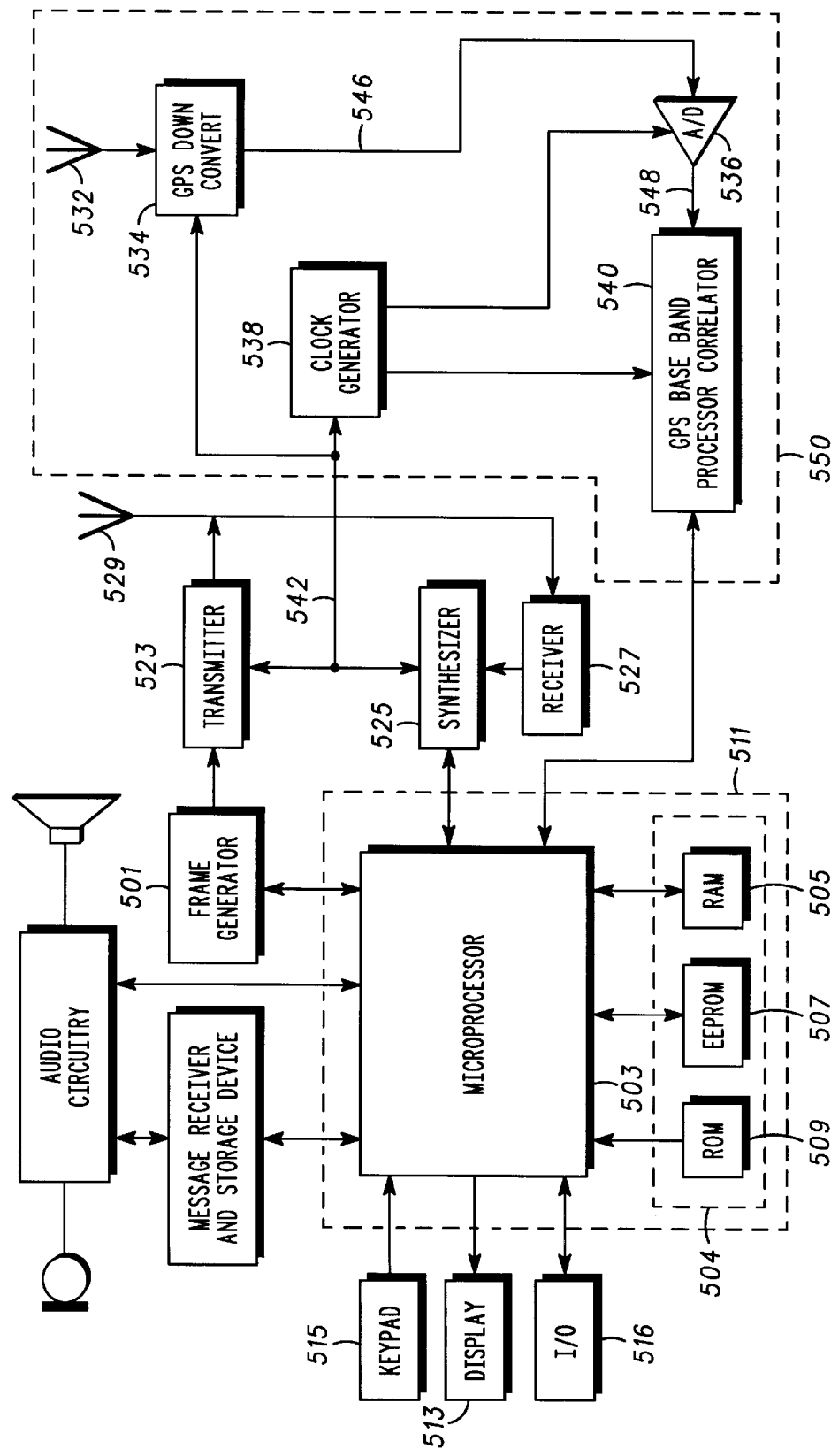

Turning to FIG. 8, a block diagram of a wireless communications device such as an assisted GPS enabled cellular radiotelephone incorporating the present invention is shown. In the preferred embodiment, a frame generator block 501 and a microprocessor 503 combine to generate the necessary communication protocol for operating assisted GPS positioning in a cellular system. Microprocessor 503 uses memory 504 comprising RAM 505, EEPROM 507, and ROM 509, preferably consolidated in one package 511, to execute the steps necessary to generate the transmit protocol and process the receive protocol. In addition, microprocessor 503 performs other functions for the wireless communication device, such as writing to a display 513, accepting information from a keypad 515, accepting input/output information by way of a connector 516, controlling a frequency synthesizer 525, performing the steps necessary to amplify a signal and receive audio output from a microphone and provide audio output to a speaker. In accordance with the preferred embodiment of the present invention, the microprocessor also controls the functions of the GPS circuitry 550 as well as computes the position of the wireless communications device.

A transmitter 523 transmits through an antenna 529 using carrier frequencies produced by the frequency synthesizer 525. Information received by the communication device's antenna 529 enters receiver 527, which demodulates the symbols using the carrier frequencies from the frequency synthesizer 525. The microprocessor 503 may optionally include a digital signal processor means for purposes of processing digital wireless waveforms such as CDMA or TDMA waveforms.

The Global Positioning System receiver 550 integrated into the wireless communications device can be of the conventional autonomous receiver design class or can be of the assisted GPS receiver design class. An example of such an autonomous GPS receiver is that described in U.S. Pat. No. 5,148,452 to Kennedy and King. An example of a GPS receiver of the assisted type is provided in U.S. Pat. No. 5,663,734 to Krasner. The conventional GPS design operates in a more autonomous mode in which all of the positioning data necessary to perform satellite-based location computations is delivered from the GPS satellites directly by way of antenna 532. The assisted GPS receiver design obtains some or all of the necessary satellite location parameters via communications antenna 529 as described in accordance with the present invention in FIGS. 1 to 7.

In accordance with the present invention, the assisted information is developed by a cellular infrastructure network entity and transmitted to the wireless communications device by way of a unique message protocol delivering some or all of the data parameters necessary for rapid location determination as described hereinabove. In addition to speeding the acquisition of location data, the assist information delivered to the wireless communications device can also greatly enhance the detection of the GPS signals in difficult signal blockage environments such as urban canyons and in buildings as described in U.S. Pat. No. 5,663,734.

The elements of an assisted GPS receiver integrated into the wireless communications device consists of a GPS antenna 532 for purposes of receiving the signals transmitted by the GPS satellites. A GPS down converter 534 translates the GPS center frequency of 1575.42 MHz to some lower intermediate or zero-IF frequency 546. The intermediate or zero IF frequency is digitized with an analog to digital converter 536, which makes periodic samples of the intermediate or zero IF frequency signal upon command from a clock generator 538. The output of the analog to digital converter 536 is delivered to a baseband processor correlator 540. The baseband processor correlator 540 performs digital signal processing functions on the signal 548 for purposes of determining the time of arrival of multiple GPS satellite signals arriving simultaneously at antenna 532. The measure of the time of arrival of the GPS signals is encoded in the codephase of each of the particular GPS satellite spreading codes received, as well as the 50 bit per second data modulation overlaid upon the satellite spreading codes.

In a preferred embodiment, the wireless communications device radio frequency generator/synthesizer 525 is used via signal 542 as the basis for the reference frequency for the GPS down converter 534. In many wireless communications devices, the radio reference frequency generator synthesizer 525 is controlled to be synchronized in frequency to the infrastructure base station carrier frequency arriving at antenna 529, which is much more stable in frequency than typical low cost handset reference frequency generators such as a crystal controlled oscillator. By using the infrastructure controlled frequency as the basis of the GPS down converter, the high frequency stability of the infrastructure base station carrier can be used to limit the Doppler frequency search space for the GPS satellite signals.

The synthesizer reference clock signal 542 is also scaled by clock generator 538 to produce the analog to digital converter 536 sample clock signal and optionally, the clock signal to drive the GPS baseband processor correlator 540.

FIGS. 9, 10, 11 and 12 correspond to the sequence of operations and computations which occur in the handset according to the possible protocols of the present invention. In FIG. 9, the combination of a "point-to-point" ephemeris protocol and a "point-to-point" differential protocol is illustrated, while FIG. 10 illustrates a "point-to-point" ephemeris protocol combined with a "broadcast" differential protocol. FIG. 11 illustrates the combination of a "broadcast" ephemeris protocol combined with a "point-to-point" differential protocol, and, finally, the combination of a "broadcast" differential protocol with a "broadcast" ephemeris protocol is illustrated in FIG. 12.

Figure 9A:
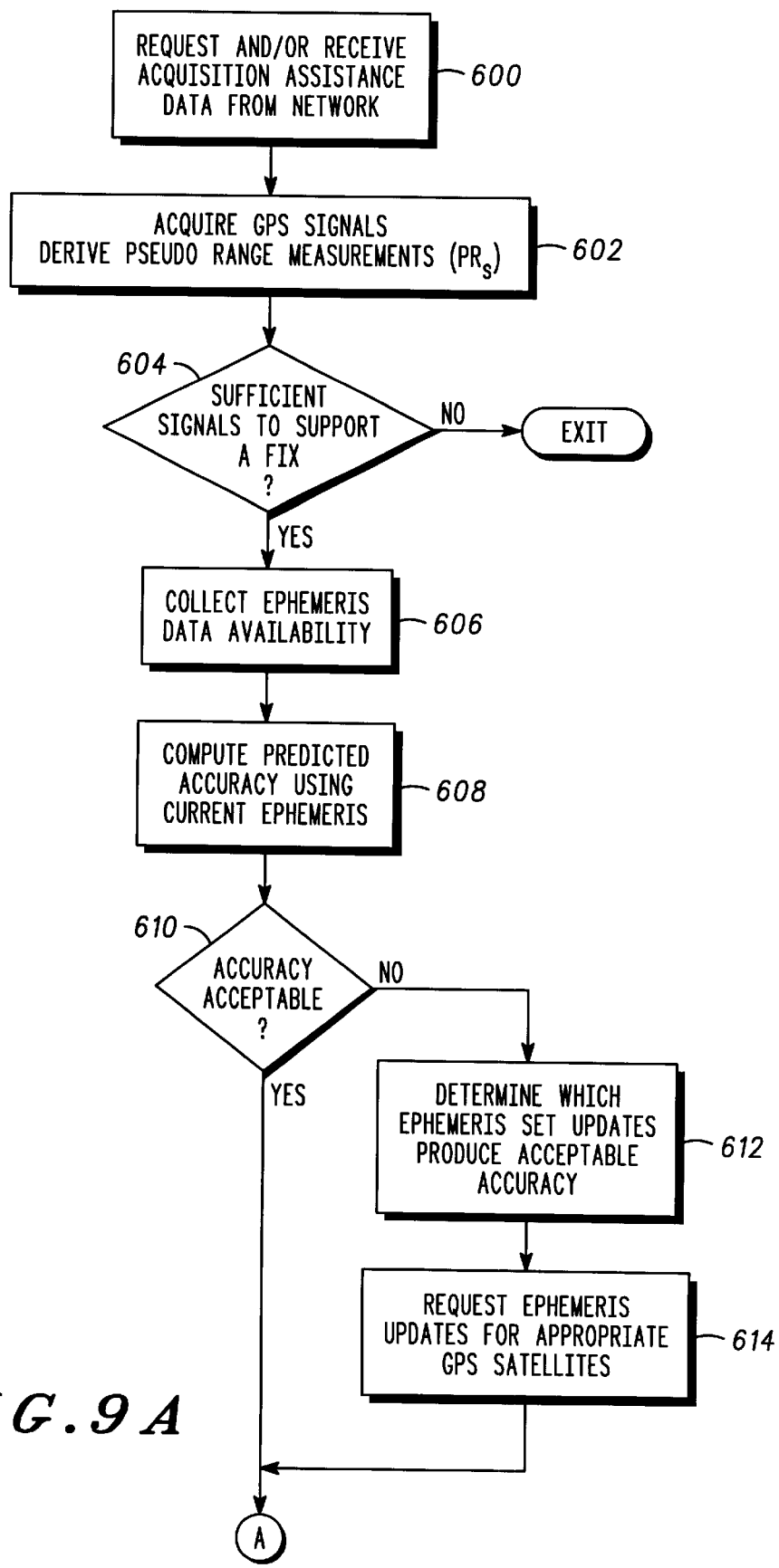
Figure 9B:
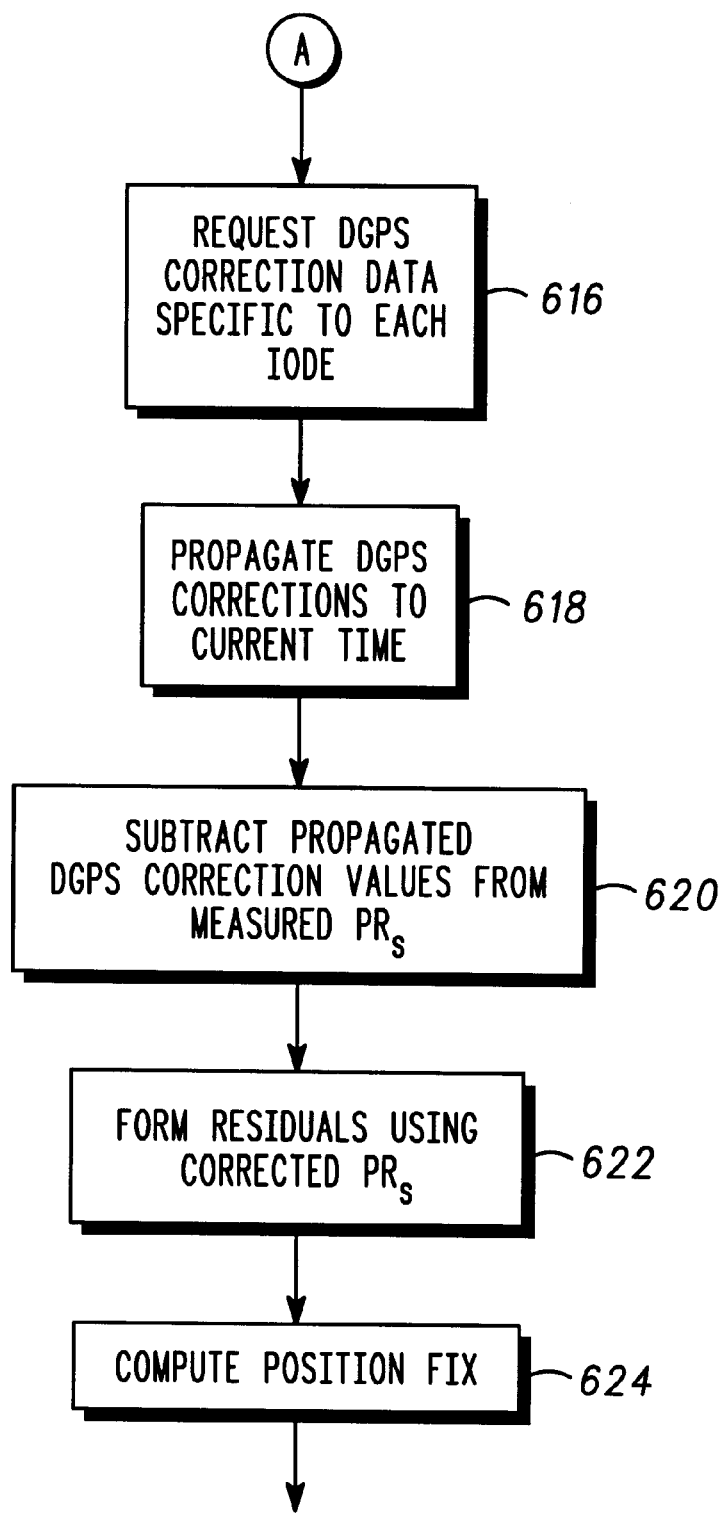

In FIGS. 9A–9B, which represents the first protocol combination of the present invention, the sequence of events within the handset begins with the acquisition of the GPS satellite signals. The GPS signal acquisition process is aided by Assistance Data which is transmitted from the cellular infrastructure in step 600: this data permits narrowing of Doppler and code phase search windows within the GPS receiver acquisition process, and so significantly speeds up the acquisition of the available GPS signals. Note that this step is common across all the protocol combinations. Once the acquisition assistance data is received, Pseudo Range (PR) measurements can be determined for the GPS signals of suitable signal strength in 602. Following this, a test 604 is made to determine if sufficient PRs are available to support a position fix: generally, four satellites are required to compute a fix; however, three satellites may be adequate if an altitude can be assumed or supplied from the infrastructure for the mobile handset. If sufficient satellites are available, the available ephemeris data is collected and examined 606, and the resultant fix accuracy is computed in step 608. If the predicted accuracy is adequate, appropriate differential correction data can be requested as in 616. If the accuracy is not adequate, however, a determination of which satellites' ephemeris data needs to be upgraded is made in 612, and requests are made for updated ephemeris for only these satellites in 614. The requested DGPS correction data 616 is specific to the IODE for each ephemeris. When the correction data is received, the corrections are first propagated to current time 618, then applied to the measured PRs 620. Residuals are formed between the measured PRs and the predicted range to each satellite (derived using the ephemeris data and a prior position estimate) 622, and used to refine the position estimate, or compute a position fix 624. In using this protocol combination, control of the transfer of data for each handsets position computations resides within the handset itself. Such a protocol will therefore minimize data transactions within the cellular network, as each transfer is driven by a mobile handset's need.

Figure 10A:
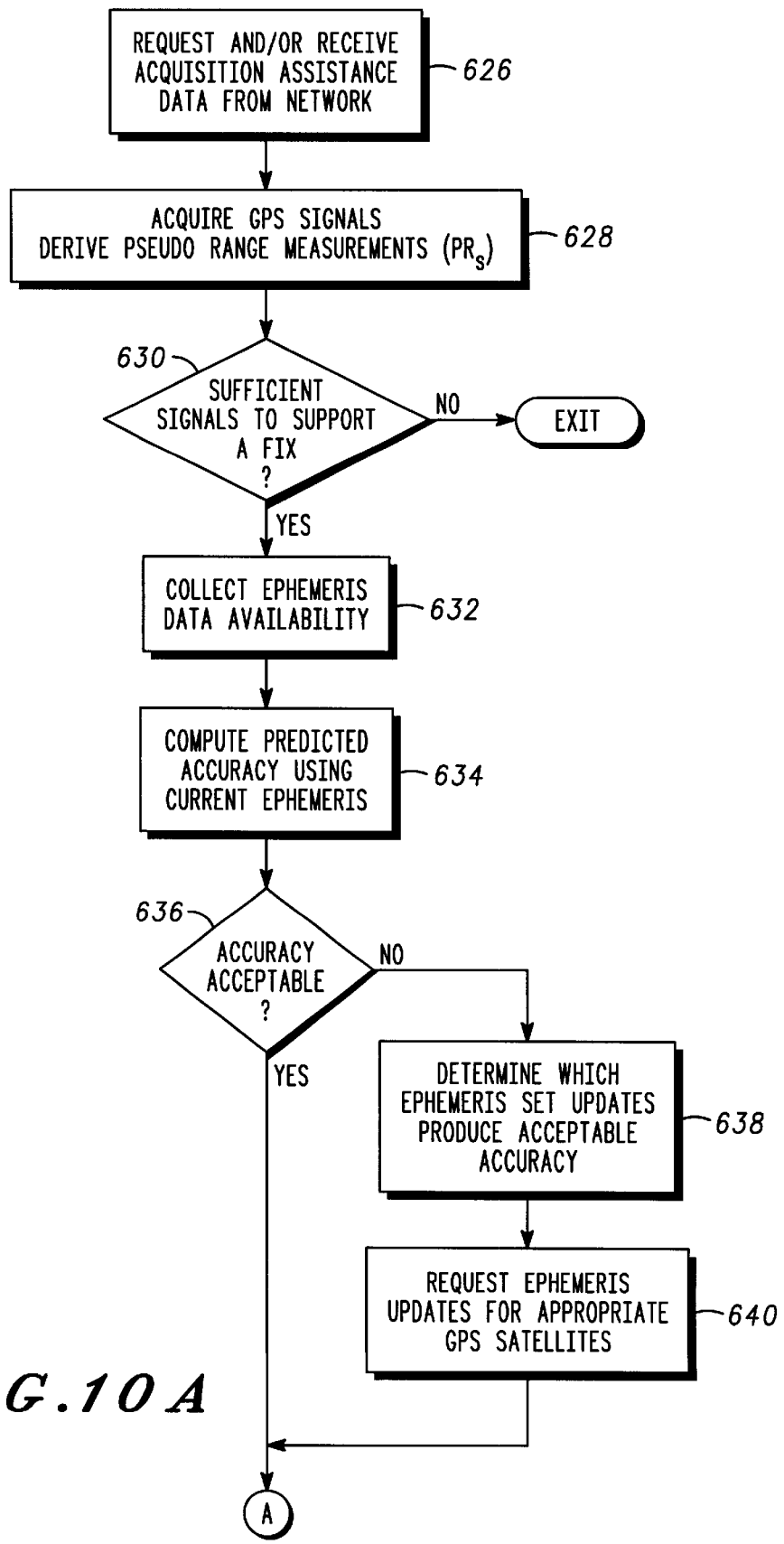
Figure 10B:
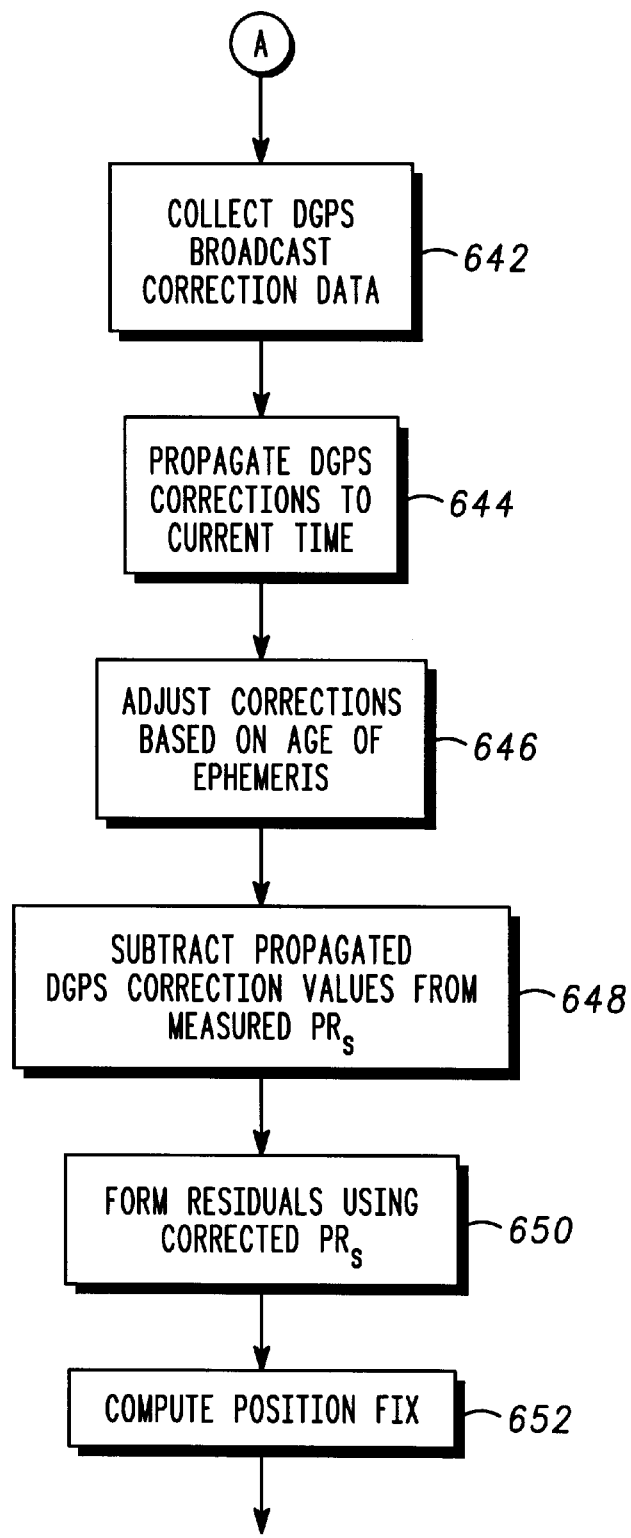

In FIGS. 10A–10B, which represents the second protocol combination of the present invention, the sequence of events within the handset begins with the acquisition of the GPS satellite signals. The GPS signal acquisition process is aided by Assistance Data which is transmitted from the cellular infrastructure in 628: this data permits narrowing of Doppler and code phase search windows within the receiver acquisition process, and so significantly speeds up the acquisition of the available GPS signals. Once the acquisition assistance data is received, Pseudo Range (PR) measurements can be derived to GPS signals of suitable signal strength in 630. Following this, a test 630 is made to determine if sufficient PRs are available to support a position fix: generally, four satellites are required to compute a fix; however, three satellites may be adequate if an altitude can be assumed or supplied from a terrain data base for the mobile handset. If sufficient satellites are available, the available ephemeris data is collected and examined 632, and the resultant fix accuracy is computed in step 634. If the predicted accuracy is adequate, appropriate differential correction data can be collected in step 642. If the accuracy is not adequate, however, a determination of which satellites' ephemeris data needs to be upgraded is made in 638, and requests are made for updated ephemeris for only these satellites in 640. In step 642, the DGPS broadcast data is collected, and then propagated to the current time in 644. In 646, the corrections must be adjusted, based on the ephemeris ages; note that the broadcast message includes corrections for all possible Issue of Data Ephemeris (IODE) values. The propagated and adjusted corrections are then applied to the measured PRs 648. Residuals are formed between the measured PRs and the predicted range to each satellite (derived using the ephemeris data and a prior position estimate) 650, and used to refine the position estimate, or compute a position fix 652. In using this protocol combination, control of the transfer of ephemeris data for each handsets position computations resides within the handset itself. Such a protocol will therefore minimize the data transactions associated with ephemeris distribution within the cellular network, as each transfer is driven by a mobile handset's need. However, use of a DGPS "broadcast" mode will increase the traffic flow for DGPS data distribution relative to the first protocol combination described in FIG. 9. This increase comes with a simplification in the logic within the infrastructure for determining when to distribute the DGPS corrections, since they will simply be broadcast at a fixed rate (e.g., typically every 30 seconds).

Figure 11A:
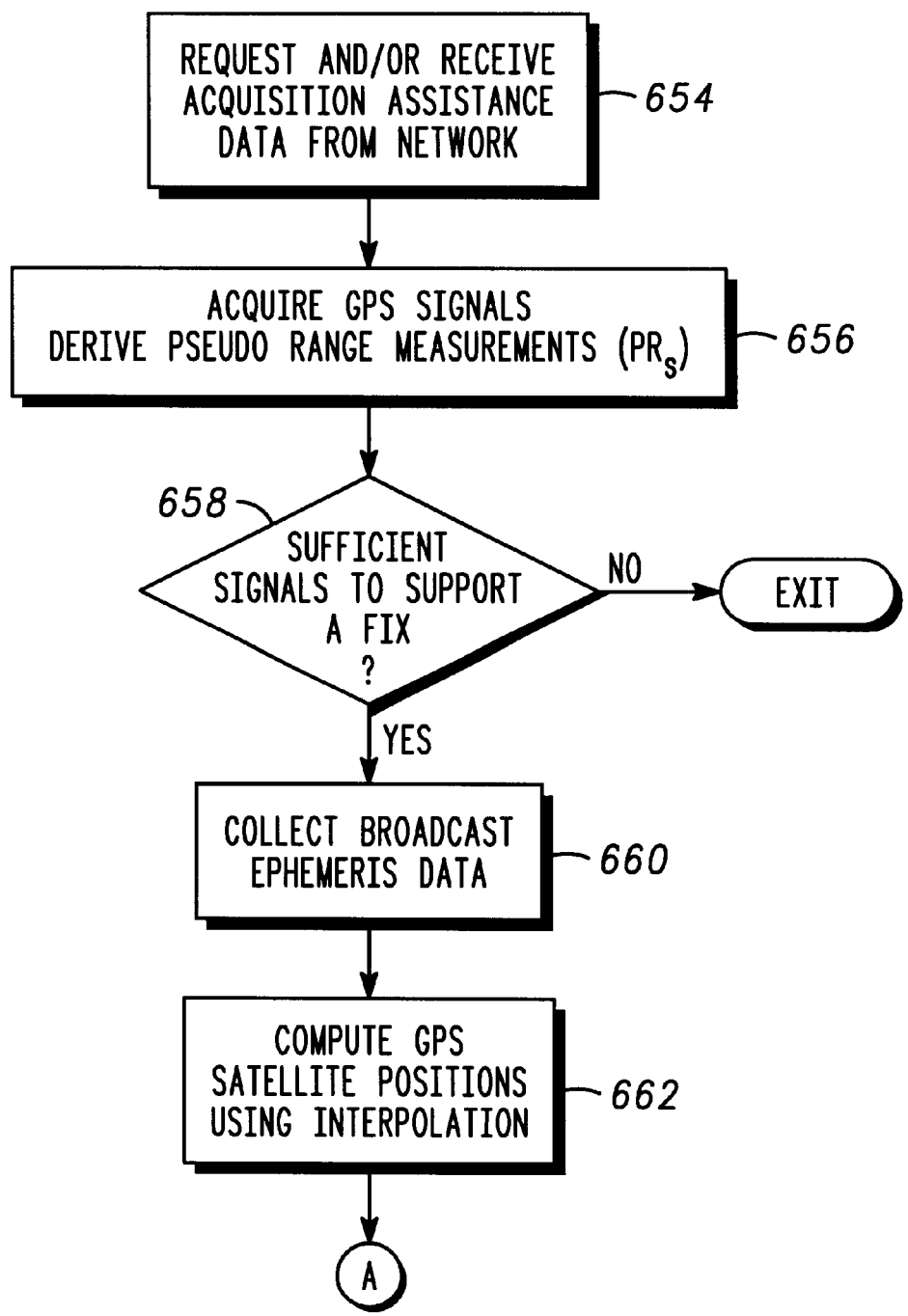
Figure 11B:
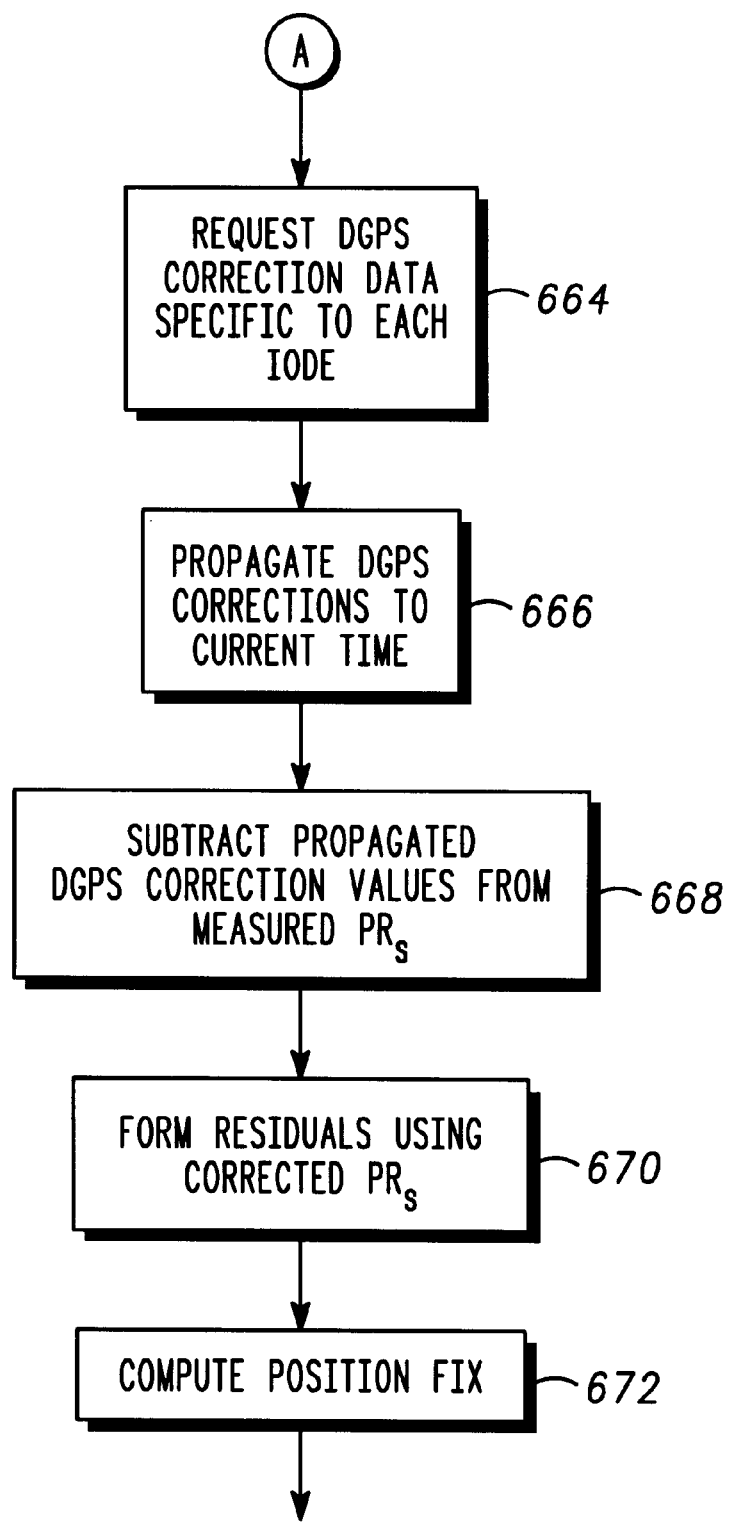

In FIGS. 11A–11B, which represents the third protocol combination of the present invention, the sequence of events within the handset begins with the acquisition of the GPS satellite signals. The GPS signal acquisition process is aided by Assistance Data which is transmitted from the cellular infrastructure in 654: this data permits narrowing of Doppler and code phase search windows within the receiver acquisition process, and so significantly speeds up the acquisition of the available GPS signals. Once the acquisition assistance data is received, Pseudo Range (PR) measurements can be derived to GPS signals of suitable signal strength in 656. Following this, a test 658 is made to determine if sufficient PRs are available to support a position fix: generally, four satellites are required to compute a fix; however, three satellites may be adequate if an altitude can be assumed or supplied from a terrain data base for the mobile handset. If sufficient satellites are available, the available ephemeris data is collected and examined in step 660. The most recent broadcast ephemeris data is collected, and then used to compute satellite positions using interpolation in 662. The requested DGPS correction data 664 is specific to the IODE for each ephemeris. When the correction data is received, the corrections are first propagated to current time 666, then applied to the measured PRs 668. Residuals are formed between the measured PRs and the predicted range to each satellite (derived using the ephemeris data and a prior position estimate) 670, and used to refine the position estimate, or compute a position fix 672. In using this protocol combination, control of the transfer of DGPS data for each handsets position computations resides within the handset itself. Such a protocol will therefore minimize data transactions within the cellular network, as each transfer is driven by a mobile handset's need. However, use of an ephemeris "broadcast" mode will increase the traffic flow for ephemeris data distribution relative to the first combination described in FIG. 9. This increase comes with a simplification in the logic within the infrastructure for determining when to distribute the ephemeris data, since it will simply be broadcast at a fixed rate (e.g., typically every 30 minutes).

Figure 12A:
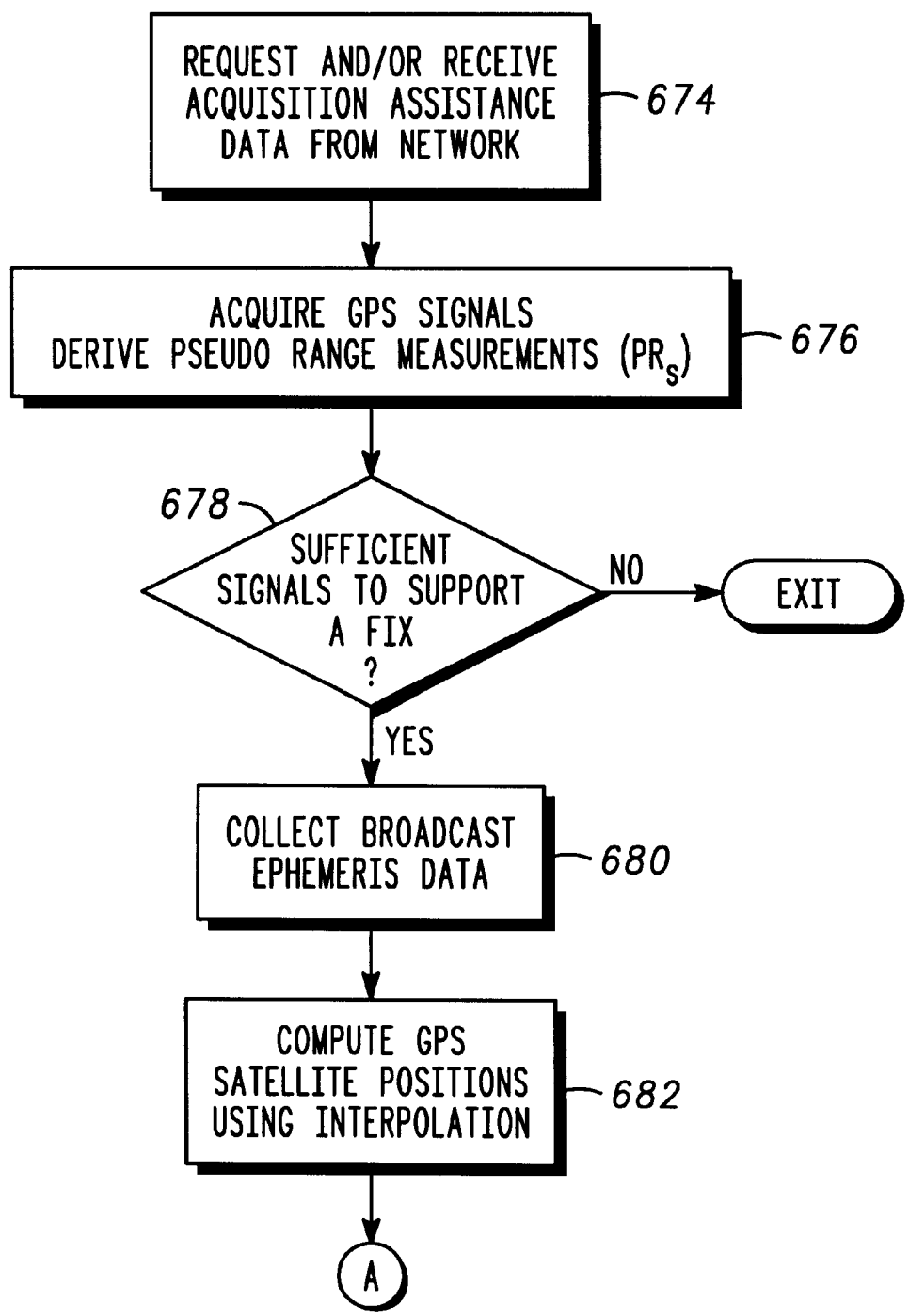
Figure 12B:
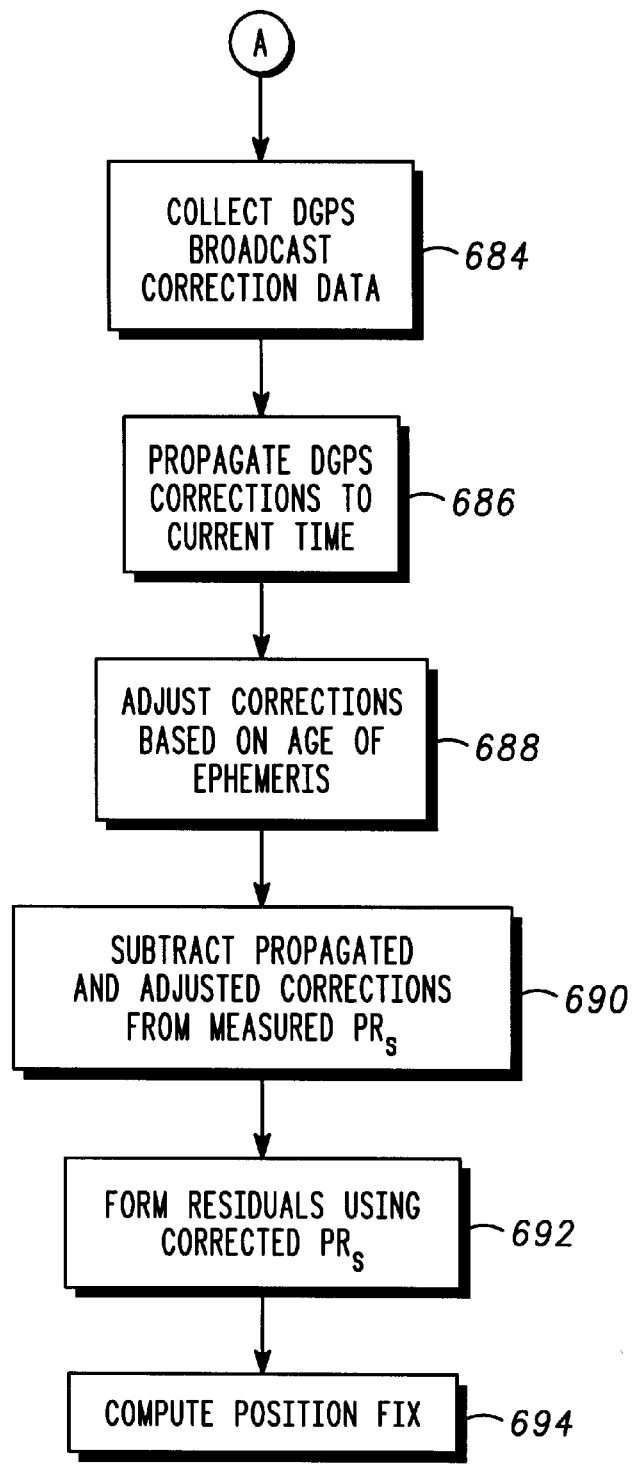

In FIGS. 12A–12B, which represents the fourth protocol combination of the present invention, the sequence of events within the handset begins with the acquisition of the GPS satellite signals. The GPS signal acquisition process is aided by Assistance Data which is transmitted from the cellular infrastructure in 674: this data permits narrowing of Doppler and code phase search windows within the receiver acquisition process, and so significantly speeds up the acquisition of the available GPS signals. Once the acquisition assistance data is received, Pseudo Range (PR) measurements can be derived to GPS signals of suitable signal strength in 676. Following this, a test 678 is made to determine if sufficient PRs are available to support a position fix: generally, four satellites are required to compute a fix; however, three satellites may be adequate if an altitude can be assumed or supplied from a terrain data base for the mobile handset. If sufficient satellites are available, the available ephemeris data is collected and examined in step 680. The most recent broadcast ephemeris data is collected, and then used to compute satellite positions using interpolation in 682. In step 684, the DGPS broadcast data is collected, and then propagated to the current time in 686. In 688, the corrections must be adjusted, based on the ephemeris ages; note that the broadcast message includes corrections for all possible IODE values. The propagated and adjusted corrections are then applied to the measured PRs 690. Residuals are formed between the measured PRs and the predicted range to each satellite (derived using the ephemeris data and a prior position estimate) 692, and used to refine the position estimate, or compute a position fix 694. In using this protocol combination, control of the transfer of ephemeris and DGPS correction data for each handsets position computations resides within the network. Such a protocol will therefore minimize the logic associated with the data distribution from the network, at the expense of additional network traffic when compared to "point-to-point" strategies.

A significant advantage of the present invention is the reduced bit rate associated with the point-to-point ephemeris transmission (see Table 1 above and Table 6 below). The predictions of average update rate appearing in the last column of Table 1 for this network-centric approach can be contrasted with the corresponding predictions for the handset-centric approach of the present invention as set out in Table 6 below. This comparison highlights the reductions in network traffic which are achieved using the proposed invention. This reduction is possible because the point-to-point and broadcast differential messages (defined in Tables 3 and 4 hereinbelow, respectively) are able to absorb the errors associated with aging ephemeris data. This derives from the very small "spatial decorrelation" of ephemeris error which is derived analytically in the following paragraphs.

Figure 13:
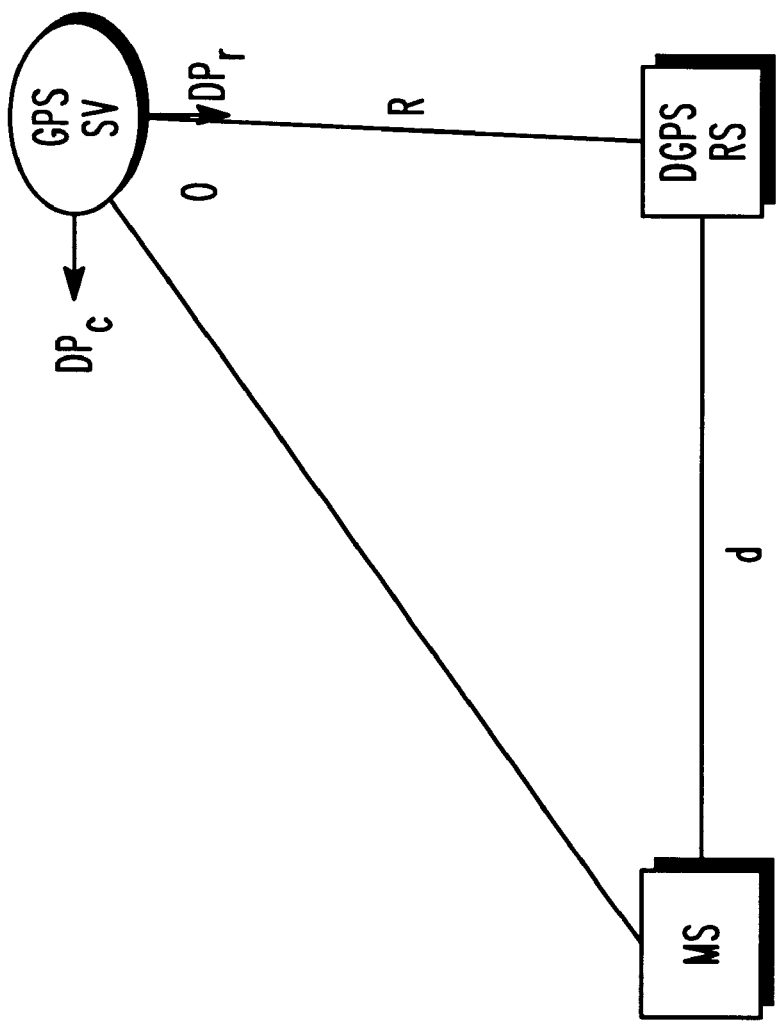
FIG. 13 is an illustration of the spatial decorrelation associated with GPS ephemeris error.

The relative geometry for a differential GPS reference station (denoted DGPS RS in the figure) and mobile handset (denoted MS) is depicted in FIG. 13, and can be used to bound the spatial decorrelation associated with ephemeris error. Because of the very large ranges to the GPS satellites, the angle $\phi$ in the figure is well approximated by:

$$\phi = d/R \quad (1)$$

Where: $\phi$ is the angle between the line of sight vectors;
  d is the distance between the mobile and the differential reference station;
  and R is the range to the GPS satellite.

Obviously, larger values for $\phi$ correspond to greater separation between the mobile and the reference station, and so greater spatial decorrelation: selecting a maximum value for d of 100 km, and a minimum value for R of three earth radii (corresponding to a satellite directly overhead) produces a maximum value for $\phi$ of 0.005 radians. The components of ephemeris error in the plane of the figure are labeled $dp_r$ (for the radial component), and $dp_c$ (for the cross-radial component in the plane of the figure). The remaining component of ephemeris error (orthogonal to the plane of the figure) will not affect the spatial decorrelation.

Spatial decorrelation results from the differences in the Line Of Sight (LOS) to the satellite from the reference station and the mobile: for the radial error component, the spatial decorrelation scale factor is (1−cost φ); for the cross-radial component, the scale factor is sinφ. Because φ is so small, the cross-radial component will dominate, and be proportional to φ itself. The worst-case scale factor is therefore 0.005 meter of post-differential correction ranging error per meter of ephemeris error. Thus, more than 200 meters of crossradial ephemeris error is necessary to produce one meter of ranging error after application of the applicable differential correction, in the worst-case.

Figure 14:
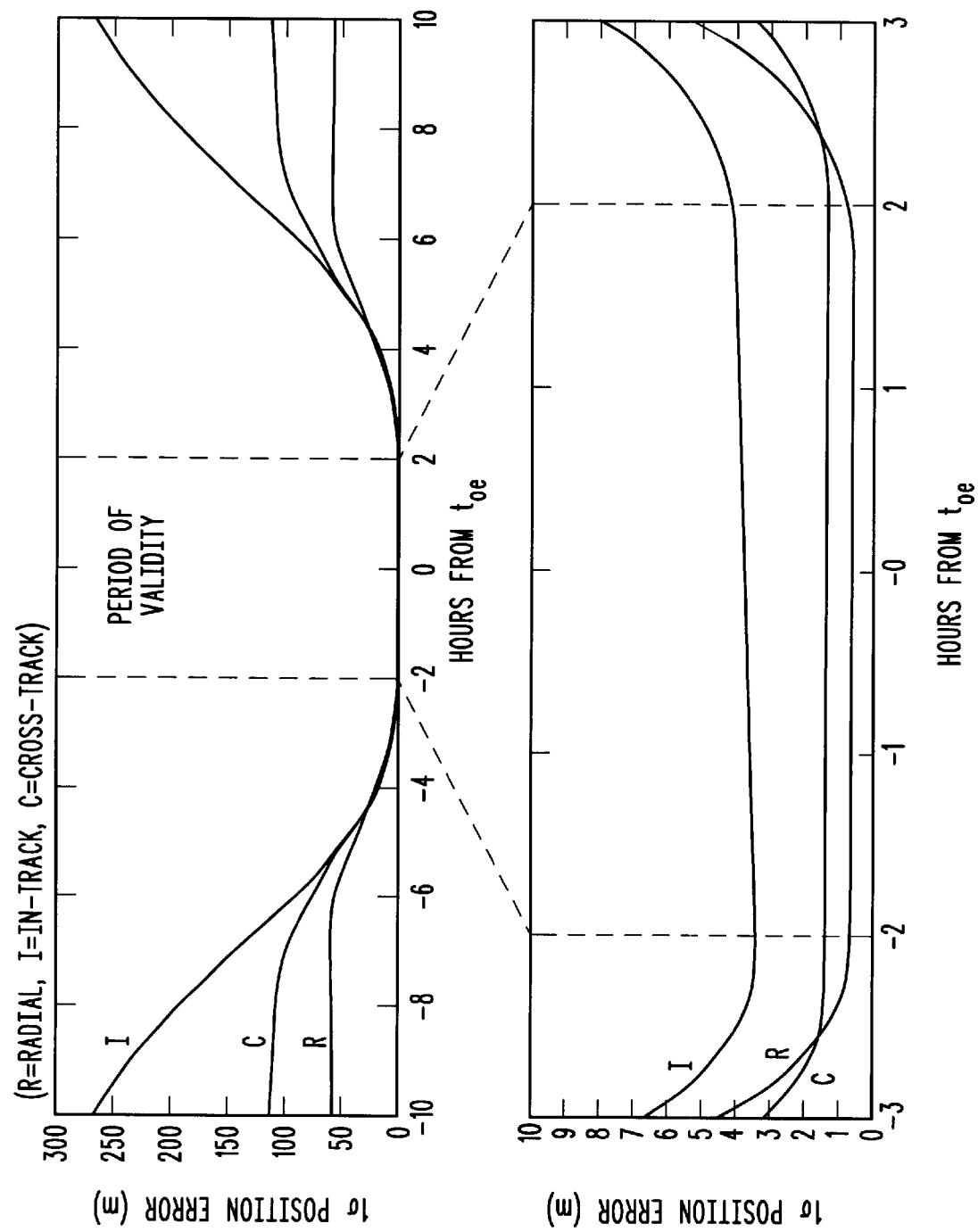
FIG. 14 is a graphic illustration of the one-sigma GPS satellite position error components as a function of ephemeris age.

FIG. 14 quantifies ephemeris position and velocity accuracy versus the staleness of the ephemeris (i.e., t-toe), expressed as one-sigma In-track (I), Radial (R), and Cross-track (C) position and velocity error components in meters and meters/sec, respectively, versus hours from the time of ephemeris applicability ($t_{oe}$). The figures were derived by computing sample standard deviations from differences of predictions from 358 broadcast ephemeris sets from 1998 with the precise ephemeris data obtained from the International GPS Service (I(S) maintained by the Jet Propulsion Laboratory.

It should be noted that typically, a GPS satellite's time of ephemeris (toe) is two hours ahead of the current time "t" when it is initially made available from the satellite and can subsequently be made available to GPS enabled mobile stations. Consequently, a value of t-toe of 2 hours corresponds to a possible four hour period of use of the same ephemeris set (−2 hours<=t-toe<=+2 hours) indicating a four hour fit interval for each ephemeris set. Accordingly, one can push the period of applicability of any particular ephemeris set to 5 hours (t-toe=+3 hours) or more with very little affect on the satellite position and velocity error (translatable to the users autonomous position error as described below). In addition, this error is completely removed by tailored DGPS corrections for the entire satellite visibility pass.

For operations near the surface of the earth, satellite track intervals are not expected to exceed 6 hours. Since the cross-radial error component makes the dominant contribution to the residual error, and this direction is generally aligned with the cross-track and in-track components, the worst-case ephemeris error can be determined using the in-track component in FIG. 14, which will be the largest component Using this component results in a worst-case one-sigma cross-radial position error component of roughly 100 meters. Scaling this by three to correspond to a worst-case, three-sigma condition, and multiplying by the worst-case spatial decorrelation scale factor derived above produces a worst-case residual ranging error of 0.4 meters, which is certainly acceptable in light of the requirements for emergency location and other location based services.

The invention defines four point-to-point messages, and two broadcast messages: Point-to-point messages—request ephemeris/clock correction update (handset to network), ephemeris/clock correction update (network to handset), request point-to-point DGPS correction (handset to network), and point-to-point DGPS correction (network to handset); and Broadcast messages—DGPS Broadcast message (network to many mobiles), and ephemeris broadcast message (network to many mobiles). Each message exchange is discussed further, with detailed parameter descriptions.

Request Ephemeris/Clock Correction Update (mobile to network)

The point-to point ephemeris control messages permit a minimal control and transmission of raw ephemeris and clock correction data to the mobile. In this protocol, the MS informs the network which satellite ephemeris sets it contains in memory by presenting a list of SVID's and the satellite's corresponding IODE (Issue Of Data Ephemeris). In addition, the handset sends an ephemeris age limit (t-$t_{oe}$) that tells the network to send raw ephemeris for all presently visible satellites for which the handset ephemeris is now older than the ephemeris age limit specified. Finally, an ephemeris age override bit informs the network to ignore the ephemeris age limit and to deliver the raw ephemeris without regard to its age.

Given the set of IODEs from the MS corresponding to the raw ephemeris stored in handset memory, and a recognition of the minimum spatial decorrelation associated with the ephemeris error component of the differential corrections, only a single raw ephemeris is generally required for each pass of a satellite. However, it is recognized that the accuracy requirements for different classes of users will vary. Therefore, an algorithm is defined which each handset can mechanize to predict the effects of ephemeris age upon the resultant solution accuracy. This algorithm further reduces the data transmission requirements, since it will request a new ephemeris if, and only if, it is dictated by the mobile's accuracy requirements.

Because the invention requires that differential corrections be derived for each IODE, a new broadcast message is defined. This broadcast message makes use of an intelligent compression of the differential correction data such that only a single message is typically required for all the available IODEs. A description of the ephemeris broadcast message appears later.

Ephemeris/Clock Correction Update (network to mobile)

As described above, the ephemeris data is transmitted only when the MS makes a request or when the infrastructure notices that the handset ephemeris is older than that allowed by the MS designated threshold for ephemeris age. The content of this message is given in Table 2 below:

TABLE 2

| | Ephemeris/Clock Correction Update Message Content | |
|---|---|---|
| Parameter | Description | Units |
| SV_ID | Satellite ID | |
| SV_health | Health Synopsis | |
| URA | User Range Accuracy | |
| $T_{GD}$ | Correction for group delay | secs |
| $t_{OC}$ | Time of applicability of clock corrections | secs |
| $a_{f0}$ | Zero order clock correction | secs |
| $a_{f1}$ | First order clock correction coefficient | secs/sec |
| $a_{f2}$ | Second order clock correction coefficient | secs/sec$^2$ |
| $C_{rs}$ | Radial correction coefficient | meters |
| $\Delta n$ | Correction to mean motion | semi-circles/sec |
| $M_0$ | Mean anomaly | semi-circles |
| $C_{uc}$ | Argument of latitude correction coefficient | radians |
| e | Eccentricity | |
| $C_{us}$ | Argument of latitude correction coefficient | radians |
| $(A)^{1/2}$ | Square root of semi-major axis | meters$^{1/2}$ |

TABLE 2-continued

Ephemeris/Clock Correction
Update Message Content

| Parameter | Description | Units |
|---|---|---|
| $t_{oe}$ | Time of applicability of ephemeris | secs |
| $C_{ic}$ | Inclination correction coefficient | radians |
| $\Omega_0$ | Nominal longitude of ascending node | semi-circles |
| $C_{is}$ | Inclination correction coefficient | radians |
| $i_0$ | Nominal inclination | semi-circles |
| $C_{rc}$ | Radial correction coefficient | meters |
| $\omega$ | Argument of perigee | semi-circles |
| $\Omega dot$ | Rate of change of right ascension | semi-circles/sec |
| idot | Rate of change of inclination | semi-circles/sec |

The parameters which appear in Table 2 correspond to the conventional set of ephemeris and clock correction data with the addition of the URA and $T_{GD}$ parameters. Inclusion of the URA parameter will permit the MS to adjust its accuracy predictions as a function of the level of Selective Availability (SA). In addition, the ephemeris requests can be made on the basis of the accuracy prediction done by each mobile. Inclusion of $T_{GD}$ will permit each mobile to correct for group delay affects, and derive the most accurate solution possible.

Request Point-to-Point DGPS Correction (handset to network)

The point-to-point DGPS correction message is requested by the mobile when differential accuracies are required to meet the position performance requirements of the handset based application (example, emergency location). In this mode, the mobile need only request ephemeris data one time per satellite pass. The differential corrections delivered to the handset in a point to point mode are customized by the network so that the additional error effect due to the ephemeris age in the handset are absorbed and compensated by the differential correction. In this way, a simple differential correction response message as shown in Table 3, below, is used. It is expected that point-to-point differential corrections will be the preferred and mostly used configuration until broadcast differential channels become ubiquitous in GSM networks (not all GSM networks implement broadcast services). In accordance with the preferred embodiment of the present invention, the protocol is optimized for this most likely mode by minimizing the total message traffic since the raw ephemeris is only sent one time per satellite pass and the differential correction is tailored to the specific ephemeris stored by the mobile. Additional benefits of this message are that the end-application can control the location accuracy and the cellular operator can make profit out of the application or the user who has chosen the service of this particular message.

Point to Point DGPS Correction Message (network to handset)

The content of this message appears in Table 3. Note that the differential corrections are sent for only the particular IODE for which they are requested. In accordance with the preferred embodiment of the present invention, the errors associated with differential correction latency are kept to acceptable levels by advantageously sending the DGPS corrections every 30 seconds or at a rate requested by the mobile.

TABLE 3

Point to Point DGPS Correction
Message Content (per satellite)

| Parameter | Description | Parameters Sent |
|---|---|---|
| N_sats | number of satellites for which corrections appear | Once per message |
| Time | GPS time at which the correction data is valid, secs | Once per message |
| UDRE SF | scale factor for the accuracy predictor | Once per message |
| UDRE | User Differential Range Error (accuracy predictor, meters) | Once per message |
| SVID | GPS satellite for which corrections apply | For each satellite |
| Corr SF | scale factor for the correction data | For each satellite |
| IODE | ephemeris issue for which the corrections apply | For each satellite |
| PRC | pseudo range correction, meters | For each satellite |
| RRC | range rate correction, meters/sec | For each satellite |

DGPS Broadcast Message (network to many mobiles)

The present invention reduces network traffic by allowing the differential corrections to compensate for errors induced by aging ephemeris data, the corresponding broadcast DGPS message must include correction sets for all available IODE values. This could lead to a message length which exceeds the 82 octet maximum message length for GSM Short Message Service Cell Broadcast (SMSC) messages. However, as shown in Table 4 below, the data is intelligently compressed in accordance with the preferred embodiment of the present invention.

TABLE 4

DGPS Broadcast Message Content

| Parameter | Description | Parameters Sent |
|---|---|---|
| N_sats | number of satellites for which corrections appear | Once per message |
| Time | GPS time at which the correction data is valid, secs | Once per message |
| UDRE SF | scale factor for the accuracy predictor | Once per message |
| SVID | GPS satellite for which corrections apply | Once per message |
| Corr SF | scale factor for the correction data | Once per message |
| Current IODE | current ephemeris issue for which the corrections apply | Once per SVID |
| PRC - PRC$_{avg}$ | compressed pseudo range correction, meters | Once per SVID |
| RRC - RRC$_{avg}$ | compressed range rate correction, meters/sec | Once per SVID |
| N_prev | number of previous IODE correction values | Once per SVID |
| $\Delta$PRC | difference in PRC | Once per N_prev |

TABLE 4-continued

DGPS Broadcast Message Content

| Parameter | Description | Parameters Sent |
|---|---|---|
| | correction values, meters | |

Several aspects of the intelligent compression used in the broadcast message are evident from Table 4, while aothers are more subtle. The DGPS time tag is compressed relative to the full twenty bits of the RTCM standard for DGPS correction data due to each mobile having reasonably reliable timing information. The differential correction data itself is compressed by subtracting the average value of the corrections across all satellites from each PRC and RRC value. This average value reflects the common time and frequency biases in the correction data which are induced by the oscillator offset and drift. These biases have no effect on the navigation solution of the differentially corrected mobile and so can be removed. In addition, it is not necessary to include RRC values for the previous IODE's, since the velocity errors induced by ephemeris age are small relative to the nominal latency errors. Finally, because the PRC different values are driven by ephemeris age error and not by normal DGPS latency effects (e.g., SA acceleration), they do not have to be sent every thirty seconds aiding in data compression. In the worst case, sending the PRC difference values once per minute will suffice. The worst case occurs when the ephemeris is oldest, which suggests an additional compression of the data based inversely on age: i.e., the more recent PRC difference values will be sent less frequently. Using these two compression techniques, the number of bytes needed to transport the DGPS broadcast message to all visible satellites is less than eighty-two bytes.

Ephemeris Broadcast Message

The contents of the broadcast ephemeris message are given in Table 5. Note that the message is comprised of two sets of computed positions and velocities for each GPS satellite, which reduces the number of bits required to be broadcast relative to sending full sets of ephemeris data. These two sets of data are separated in time, to permit mobile handsets to interpolate between the times of applicability of the computed data to derive position and velocity data at the current time. The use of interpolation, rather than extrapolation, removes any significant error relative to a handset computation based upon a full set of ephemeris data.

TABLE 5

Broadcast Ephemeris Message

| Parameter | Description |
|---|---|
| $t_0$ | time of applicability of first set of positions and velocities, secs |
| $\Delta t$ | time interval between sets, mins |
| N_sats | number of GPS satellites for which position and velocity data follow |
| SVID | ID for this set of positions and velocities |
| $X_0$ | ECEF X position component at time t, meters |
| $Y_0$ | ECEF Y position component at time t, meters |
| $Z_0$ | ECEF Z position component at time t, meters |
| X_dot$_0$ | ECEF X velocity component at time t, meters/sec |
| Y_dot$_0$ | ECEF Y velocity component at time t, meters/sec |
| Z_dot$_0$ | ECEF Z velocity component at time t, meters/sec |
| $X_1$ | ECEF X position component at time t + $\Delta t$, meters |
| $Y_1$ | ECEF Y position component at time t + $\Delta t$, meters |
| $Z_1$ | ECEF Z position component at time t + $\Delta t$, meters |
| X_dot$_1$ | ECEF X velocity component at time t + $\Delta t$, meters/sec |
| Y_dot$_1$ | ECEF Y velocity component at time t + $\Delta t$, meters/sec |
| Z_dot$_1$ | ECEF Z velocity component at time t + $\Delta t$, meters/sec |

To further reduce the number and length of the broadcast ephemeris messages, the present invention would encompass an ephemeris broadcast message that sends only one satellite position and velocity vector per message. This would require the mobile station to obtain two successive ephemeris broadcast messages at $t_1$ and $t_2$ before being able to compute the position of the mobile station at some other time between $t_1$ and $t_2$.

In accordance with another aspect of the present invention, an algorithm is used by the handset to compute satellite position and velocity at an arbitrary time $t_0 < t < t_1$ (where $t_1 = t_0 + \Delta t$). The algorithm is iterative in nature, taking two steps which are comprised of first computing an initial acceleration estimate from the velocity data, then using this, together with the position data, to compute a jerk (the derivative of acceleration), which is then used to refine the position estimates. The algorithm is identical for each component of position and velocity, so only a single component is detailed in the equations below. An acceleration estimate is found using Equation (2):

$$X\_ddot = (X\_dot_1 - X\_dot_0)/(t_1 - t_0) \qquad (2)$$

The acceleration estimate from Equation (2) is used to predict $X_1$ using Equation (3) below:

$$X_1\_hat = X_0 + X\_dot_0 \Delta t + X\_ddot\, \Delta t^2/2 \qquad (3)$$

The difference between the predicted $X_1$ and its computed value is used to find a jerk level which brings the predicted value into agreement with the computed value:

$$\Delta X_1 = X_1 - X_1\_hat = X\_dddot\, \Delta t^3/6 \qquad (4)$$

Equation (4) is used to solve for the jerk value (X_dddot), and this is used in the Equation (5) to interpolate for the GPS satellite position:

$$X(t) = X_0 + X_0\_dot(t - t_0) + X_0\_ddot(t - t_0)^2/2 + X_0\_dddot(t - t_0)^3/6 \qquad (5)$$

Figure 15:
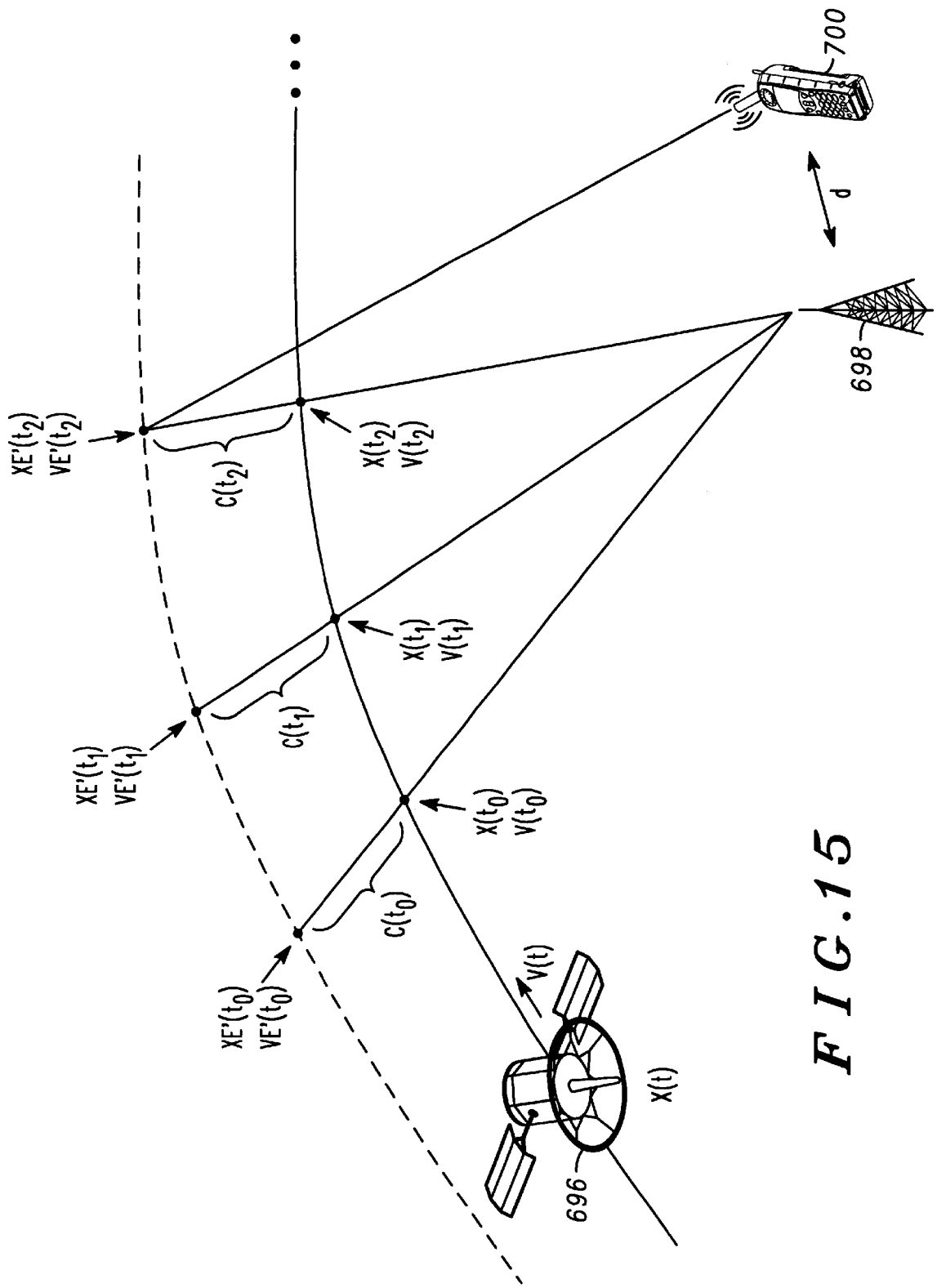
FIG. 15 is a diagram of actual and estimated satellite positions in accordance with the preferred embodiment of the present invention.

Note that the satellite clock correction data is bsent from this broadcast message. This is enabled by appropriately modifying the position and velocity data which is sent to absorb the clock error effects as illustrated in FIG. 15. FIG. 15 illustrates estimated and actual satellite positions, wherein provision is made for combining the satellite position curve fit data with the satellite clock correction parameters. This permits elimination of the clock correction parameters completely and reduces even further the number of bits to be transmitted from 254 bits to 217 bits per satellite. In order to accomplish this, the effect of the clock error must be translated into an equivalent satellite position error.

In FIG. 15, a satellite 696 of a global navigation positioning system such as GPS orbits above a radio communication system. The radio communication system includes a plurality of base stations 698 in two-way radio communication with mobile stations such as mobile station 700. Translating the effect of clock error into equivalent satellite position error requires that the satellite orbit curve fit X(t) be modified by an amount corresponding to the satellite clock correction. Effective range extensions $C_0$, $C_1$, and $C_2$ are computed from the satellite clock correction as derived from the ephemeris data at time $t_0$, $t_1$, and $t_2$ multiplied by the speed of light (SOL). This magnitude can be either positive (farther away) or negative (closer to the mobile station), but typically is on the order of less than 1 ms (but can be has large as 5 ms).

The effective position XE' (t) is calculated as follows:

$$XE'(t_0) = X(t_0) + C(t_0)SOL\left(\frac{X(t_0) - R}{|X(t_0) - R|}\right) \quad (6)$$

In order to modify the effective satellite orbit, a reference point "RL" is required to project the satellite orbit position along the line extending between its true position X(t) and the RL. The RL can conveniently be the base station 698. Simple vector mathematics modifies the satellite orbit path X(t) to the modified orbit path X' (t).

Choosing each ind ividual base station o f the system as the reference site allows for control of the error induced in the range measurement. It is assumed that the base s tation 698 is within 10 Km of the mobile station 700 (valid most of the time in cellular systems). Also, it is known that the satellite clock correction cannot be any larger than 5 ms, since this is the maximum magnitude of the parameter. The maximum error in satellite predicted range is a function of this clock error and the base station-to-mobile-station separation distance. The maximum error in th e measured range based on the modified or projected satellite orbit, a 10 Km mobile to reference point distance, and 5 ms of clock correction is approximately 1 meter, which is acceptably small given other system errors such as multipath, receiver noise, ionospheric delay, and other quantization effects.

Protocol Performance Prediction—Autonomous GPS Mode

The performance of the present invention can be predicted by examining distributions of satellite tracking intervals (which dictates the ephemeris age distribution) at different latitudes, and calculating the average number of ephemeris sets required per satellite. This analysis is summarized in Table 6 below. The averages appears in the last column and a comparison of that column with the last column in Table 1 (presenting corresponding performance data of the prior art), clearly illustrates the advantages of the present invention. For all latitudes, the ephemeris updates are reduced, ranging from 40% at the higher latitudes to 45% at the equator.

TABLE 6

Total Bits Delivered for the Invention to the MS per Visible Satellite

| Latitude | % SV's With Raw EPH Update | % SV's with Subseq Raw EPH Update | Total Raw Equiv Updates per SV |
| --- | --- | --- | --- |
| 60 Deg | 100% | None | 1.0 × Raw EPH Bits |
| 30 Deg | 100% | None | 1.0 × Raw EPH Bits |
| 15 Deg | 100% | 17% | 1.17 × Raw EPH Bits |
| Equator | 100% | 33% | 1.33 × Raw EPH Bits |

Use of Age of Ephemeris to Control Update Requests

If the request was for ephemeris data, then the BS or SMLC need only send ephemeris data for currently visible satellites that are not already stored in the handset's memory or that violate the "ephemeris age limit" parameter as specified by the particular mobile (the autonomous user end-application should set this based on the applications position accuracy requirements). Thus, in accordance with the preferred embodiment of the present invention, the protocol only delivers ephemeris data to the mobile for new satellites that may have risen since the last request.

If the end application is using DGPS corrections, then the "ephemeris age limit" can be set high indicating that the raw ephemeris in the handset does not need to be updated for the entire visible pass of that satellite. In this case, fresh raw ephemeris data is delivered to the mobile station only one time and is used for the entire visible satellite pass.

The handset eliminates old ephemeris data sets from its memory in several ways. For example, as long as the handset has a time-interval counter, it can keep track of time since the ephemeris was accepted in the handset. Since it is known that ephemeris is no longer valid after a certain time period such as 4 to 6 hours, the handset can invalidate the stored ephemeris after this time period expires. In addition, the mobile can always check to see if the satellite has set below the local horizon by evaluating the ephemeris at the current time. The ephemeris should be eliminated for any setting satellite, In addition, the mobile station, when it obtains a new ephemeris set, tags the GPS week number (contained in the response header) to the ephemeris data so that the mobile station itself can decide when a particular data set it now too old and can be eliminated from memory.

Description of Algorithm for Embedment into Cellular Handset for Determining an Optimum Procedure for Updating the Handset Ephemeris.

Another aspect of the present invention is a method, which can be implemented in a cellular handset, to determine when to request an ephemeris update from the cellular infrastructure. Since the error which is induced by the ephemeris age can be compensated using appropriately generated differential corrections, the method is only intended to be used when the handset is operating autonomously. The objective of the method is to minimize the number of ephemeris update requests. The number of requests is minimized by explicitly modeling the effect of ephemeris age upon the GPS pseudo range (PR) residual; by using this model in the solution method (if a Weighted Least Squares (WLS) algorithm is utilized); by predicting the solution accuracy with the current set of ephemeris data; and, finally, if the predicted solution accuracy is excessive, by basing the handset ephemeris update request upon the effect of the ephemeris update on the predicted solution accuracy.

In predicting the solution accuracy, both a priori (i.e., covariance information) and a posteriori (i.e., unit variance information when the solution is overdetermined) statistics should be used. Since much of the required computations are already performed by the handset in deriving a fix, the method does not place significant additional computational burden on the handset.

Prediction of Navigation Error

Figure 16:
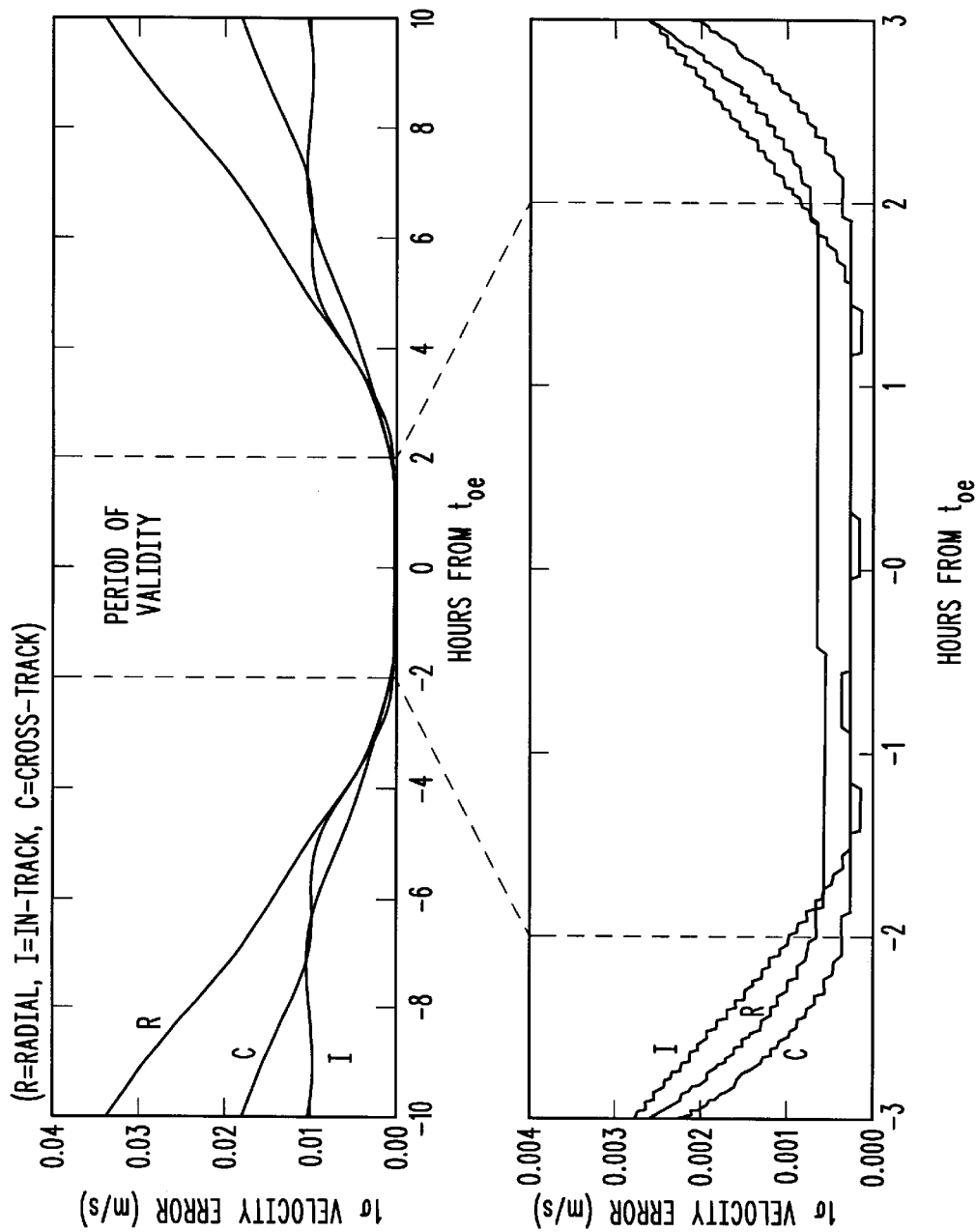
FIG. 16 is a graphic illustration of the one-sigma GPS satellite velocity error components as a function of ephemeris age.

FIGS. 14 and 16 provide estimates of one-sigma in-track, cross-track, and radial error components of the ephemeris-derived satellite position as a function of its age. Of course, the accuracy of the pseudorange measurements derived by the GPS receiver are not directly affected by the ephemeris age. However, in deriving navigation information from the set of available pseudorange measurements, it is necessary to predict the positions of the GPS satellites, and so the ephemeris error component along the Line Of Sight (LOS) to each satellite directly affects the navigation accuracy. In general, the LOS ephemeris error component is a combination of the in-track, cross-track, and radial components, but will be dominated by the radial component: in the worst-case relative geometry, 24% (the sine of fourteen degrees) of the in-track or cross-track error will be along the LOS, corresponding to a satellite at zero elevation angle.

Very coarse, conservative predictions of the navigation error result from the use of old ephemeris data in conventional prediction calculations. Since it was implicitly assumed that the ephemeris for each satellite was equally old, the estimates were overly conservative.

More generally, and realistically, only a subset of the satellites in view have been tracked for greater than six hours, and so old ephemeris data may be used for some prediction calculations in accordance with the present invention. The effect of the ephemeris error upon navigation error can be determined from the satellite geometry and the algorithm used:

$$e = (H^T H)^{-1} H^T \delta PR \text{ (LS solution)} \tag{7}$$

$$e = (H^T R^{-1} H)^{-1} H^T R^{-1} \delta PR \text{ (WLS solution)} \tag{8}$$

where: e denotes the 4 dimensional navigation (and clock) error vector;

H is the measurement gradient matrix;

R is the estimated measurement error variance matrix;

and, $\delta PR$ is the m-dimensional vector of pseudorange errors.

Generally, use of the WLS algorithm is preferred, since it will enable deweighting of pseudo ranges from satellites for which older ephemeris data is used (when the solution is overdetermined, i.e., when m exceeds four). The measurement deweighting is effected by including the one-sigma error associated with the ephemeris age in the estimated measurement error covariance matrix R.

By taking the outer product of the navigation error vector and squaring Equations (7) and (8), and then taking expected values, the following equations result for the navigation error covariance matrix:

$$P = (H^T H)^{-1} H^T R H (H^T H)^{-1} \text{ (LS solution)} \tag{9}$$

$$P = (H^T R^{-1} H)^{-1} \text{ (WLS solution)} \tag{10}$$

In deriving Equations (9) and (10), the estimated and actual measurement error covariance matrices (denoted R) are assumed equal. Note that the navigation error covariance matrix, P, for the WLS solution is already computed by the WLS algorithm, but additional calculations are required for the LS algorithm, as given by Equation (9).

For overdetermined solutions, the unit variance statistic should be computed:

$$u = f^T f / (m-4) \tag{11}$$

where: f is the m dimensional fault vector.

Although not completely rigorous, the unit variance is a measure of the consistency of the measurements (relative to their assumed error statistics); an excessively large value is therefore indicative of faulty measurement data, and so can be used to scale the navigation error covariance and make it more realistic.

Given the characterization of navigation error provided by Equations (9), (10) and (11), and a specification of the navigation error which the handset can tolerate, the following test is used to control the request for an updated ephemeris:

$$\alpha^2 (P(1,1) + P(2,2) + P(3,3)) > e_{max}^2 \tag{12}$$

The parameter $\alpha$ controls the level of conservatism. For example, an $\alpha$ of 2 corresponds to a 95% confidence that er is not exceeded. The three elements of the covariance matrix appearing in Equation (12) correspond to east, north, and vertical position error, respectively; if P(3, 3) is removed, the test will be based solely on the expected horizontal position error variance.

Should Equation (12) indicate that the navigation error is excessive, additional tests are performed to determine if one or more ephemeris updates could be expected to result in an acceptable navigation solution (i.e., the test expressed by Equation (12) fails). Alternatively, the test can be used to determine if one or more ephemeris updates produces a significant reduction in the predicted navigation error. These tests remove the contribution from ephemeris error (as it affects the appropriate elements of R) in Equations (9) or (10), perhaps scaled by Equation (11). The test indicated by Equation (12) is then repeated, to determine if an ephemeris update for the satellite or satellites under test will make the navigation solution acceptable. The tests are performed for all satellites with an ephemeris at least four hours old, proceeding from the oldest ephemeris, and including previously tested satellites in each new test set. In this way, the minimum number of ephemeris updates required to produce acceptable navigation performance will be requested, and so ephemeris updating is minimized.

Prediction of the Spatial Decorrelation of Ephemeris Error

Refer again to FIG. 13 wherein the geometry associated with spatial decorrelation of ephemeris error is illustrated. Assuming a separation distance d between the MS and RS, and radial and along-track components of ephemeris error, $\delta p_r$ and $\delta p_{at}$, the difference in range error measured by the MS and RS is proportional to the sine of the angle $\theta$ (for the along-track component), and proportional to one minus the cosine of the angle $\theta$ (for the radial component). Because the range to the GPS satellites is so large (at least three earth radii), $\theta$ is expected to be a very small angle, and so the along-track error effect will dominate. Equation (13) provides the sensitivity of the spatial decorrelation to this error:

$$\delta PR = (d/3R_e)\delta p_{at} \quad (13)$$

For a twenty kilometer separation, Equation (13) indicates that 1 kilometer of ephemeris error (assumed in the along track direction) results in only 1 meter of residual pseudo range error after the differential correction is applied. Thus, use of differential corrections can permit use of an older ephemeris set by the MS, as long as the IODE values match between the MS and RS. This requires that the software which generates the differential corrections store additional ephemeris sets, and generate the corrections for the appropriate set. Ephemeris data as old as ten hours (see FIG. 14) can be expected to produce a degradation of roughly 250 meters, one sigma, well within the acceptable range predicted by Equation (13), since a worst-case ephemeris error, characterized as a four sigma case, produces only one kilometer of error.

The curves appearing in FIG. 14 predict the one sigma error associated with ephemeris based GPS satellite position estimation as a function of ephemeris age. They were derived from an analysis of a full day's worth of GPS ephemeris data, using a precision ephemeris posted on the internet by the Jet Propulsion Laboratory (sub-meter accuracy) as a truth source.

Justification of Broadcast Ephemeris Compression of PRC and RRC Differences

The (one-sigma) error induced by Selective Availability (SA) dither due to the latency of the differential correction data is given by:

$$\sigma_{SA} = \sigma_{SAacc}\Delta t^2/2 \quad (14)$$

For $\Delta t=30$ seconds, and $\sigma_{SAacc}=0.005$ m/sec$^2$ (experience with SA indicates this is a reasonable and conservative number to use), the one-sigma latency error is 2.25 meters, or the worst-case error (3 sigma) is 7.75 meters. This number will serve as a baseline for comparison of the magnitude of the effects of latent $\Delta PRC$ values: if the worst-case error induced by $\Delta PRC$ latency is less than that attributable to SA, then the latency will be judged acceptable.

Note that the effects of $\Delta PRC$ latency include both velocity and acceleration error effects, since $\Delta RRC$ values are not included in the broadcast message. The effects of the velocity error can be accessed by reference to the one-sigma velocity error curves in FIG. 16. Looking out to ten hours (assumed to be the worst-case) from the time of ephemeris applicability (denoted $t_{oe}$), the one-sigma radial velocity error is roughly 0.033 m/sec. A sixty second latency therefore produces 1.98 meters, one-sigma, of error, or 5.94 meters in the worst-case, less than the error induced by SA over thirty seconds. Note that the latency is reduced, roughly linearly, as the time from toe is reduced: e.g., for $\Delta PRC$ values corresponding to an ephemeris which is only six hours old, the worst-case error is reduced to 2.7 meters. This suggests that the $\Delta PRC$ values which correspond to more current ephemeris data can be sent less frequently to save additional bits. The acceleration errors, though not included in the analysis of ephemeris error, are expected to be very small, since the error effects are sinusoidal in nature, with the period of the sinusoid equal to the orbital period. A worst-case acceleration error can therefore be established by taking the peak velocity error (for a ten hour old ephemeris), and dividing it by the orbital period. A value of 1.4 μg results, which produces 0.05 meters of position error after sixty seconds.

Referring to FIGS. 17 to 20, an alternate embodiment of the present invention is depicted. This alternate embodiment of the present invention differs from the preferred embodiment described hereinabove in that the preferred embodiment is a Base Station Subsystem (BSS) and has a BSS-based SMLC 112, while the alternate embodiment depicted in FIGS. 17 to 20 is a Network System Subsystem (NSS).

Figure 17:
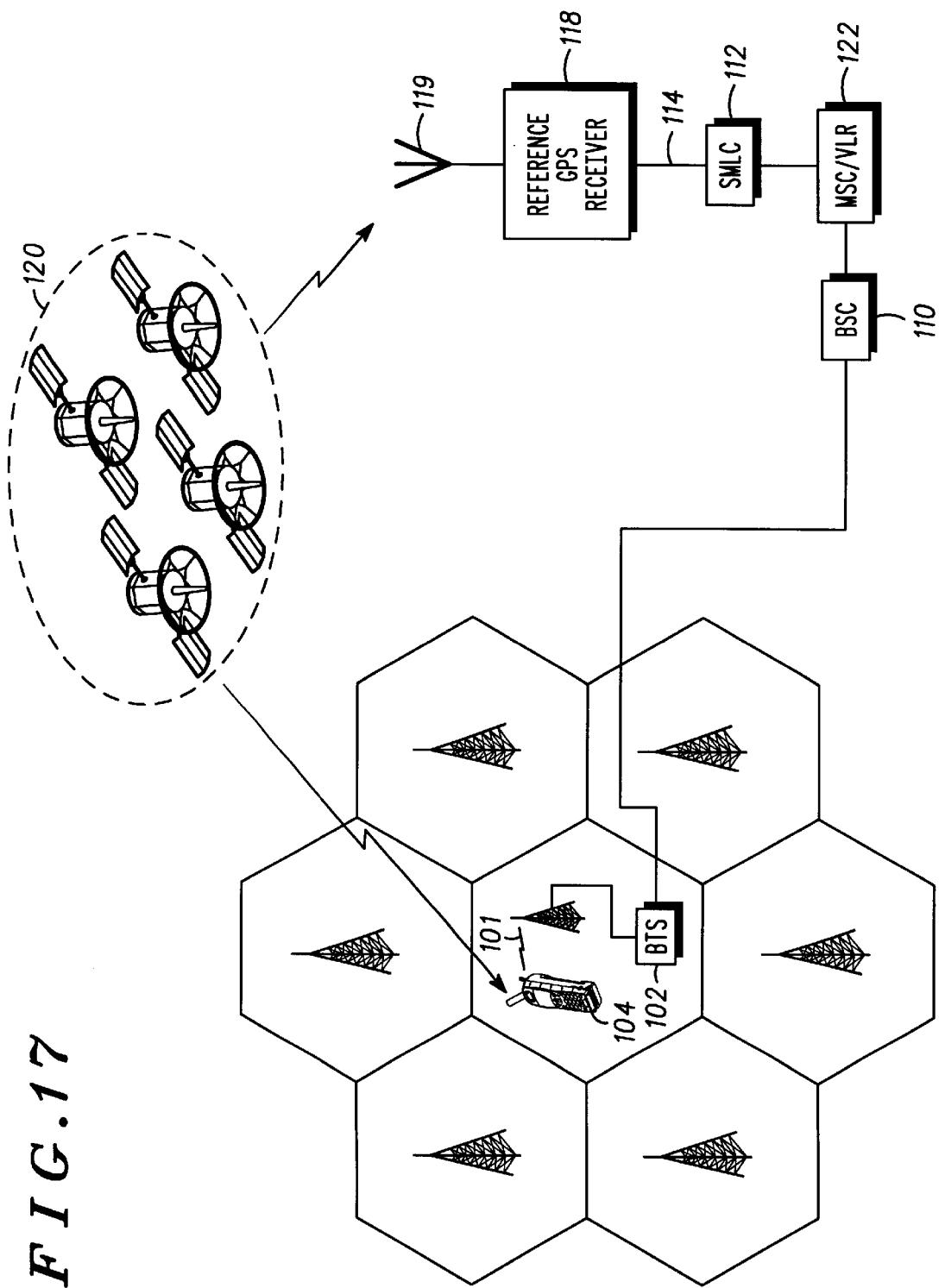
FIG. 17 is a system diagram of an Assisted GPS cellular radiotelephone system in accordance with an alternate embodiment of the present invention.

FIG. 17 is the system diagram of the alternate embodiment of the present invention comprising an NSS based SMLC 112. The system is similar to the one depicted in FIG. 1 except that the SMLC 112 is connected to the MSC/VLR 122 instead of the BSC 110.

Figure 18:
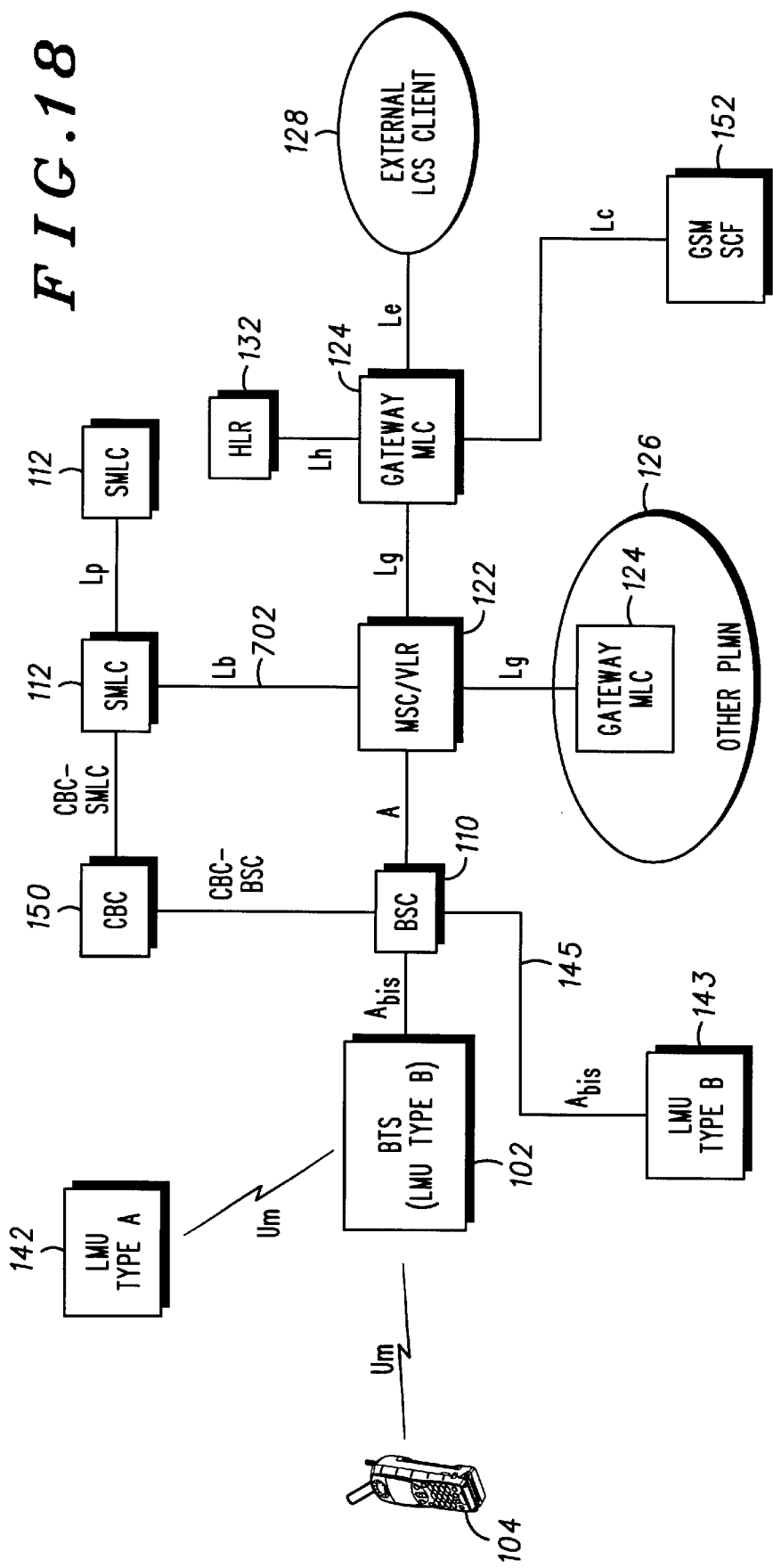
FIG. 18 is a block diagram of a cellular radiotelephone system architecture capable of supporting Location Systems (LCS) in accordance with the alternate embodiment of the Assisted GPS radiotelephone system of FIG. 17.

FIG. 18 shows an architecture capable of supporting the location service (LCS) in accordance with the alternate embodiment of the present invention depicted in FIG. 17. Detailed discussion of this architecture is very similar to the description in FIG. 2, except that this is an architecture for an NSS based SMLC 112. In other words, this architecture supports positioning of a target MS 104 via signaling on the Ls interface 702 to the visited MSC 122. The rest of the description in FIG. 2 should be applicable to this figure. The MSC 122 contains functionality responsible for MS subscription authorization and managing call-related and non-call related positioning requests of GSM LCS. The MSC 122 is accessible to the GMLC 124 via the Lg interface and the SMLC 112 via the Ls interface 702. Signaling between an NSS based SMLC 112 and LMU 142, 143 is transferred via the MSC 122 serving the LMU 142, 143 using the Ls interface 702 and either the Um interface (Air Interface to an LMU) for a Type A LMU 142 or the Abis interface for a Type B LMU 143.

Figure 19:
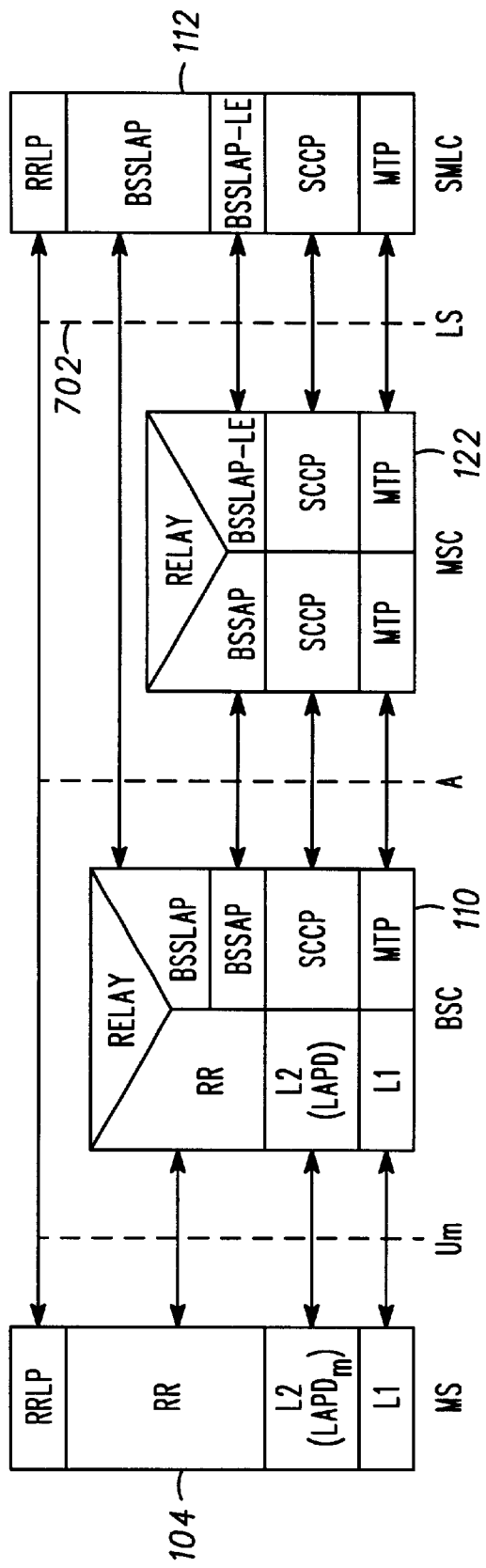
FIG. 19 is a protocol-level flow diagram of the operation of the Assisted GPS radiotelephone system of FIG. 17 in accordance with the alternate embodiment of the present invention.

FIG. 19 shows the protocol layers used to support signaling protocols between an SMLC 112 and target MS 104 with an NSS based SMLC 112 in accordance with the alternate embodiment of the present invention depicted in FIG. 17. The details of signaling between the SMLC 112 and the MS 104 are similar to the signaling discussed in regards to FIG. 4 hereinabove except that the signaling between the SMLC 112 and the BSC 110 in an NSS based system is not direct and necessarily involves signaling from the SMLc 112 to the MSC 122 and, thence, to the BSC 110. The signaling protocols and their use are well-known to those familiar with GSM cellular systems and the protocols used therein.

Figure 20:
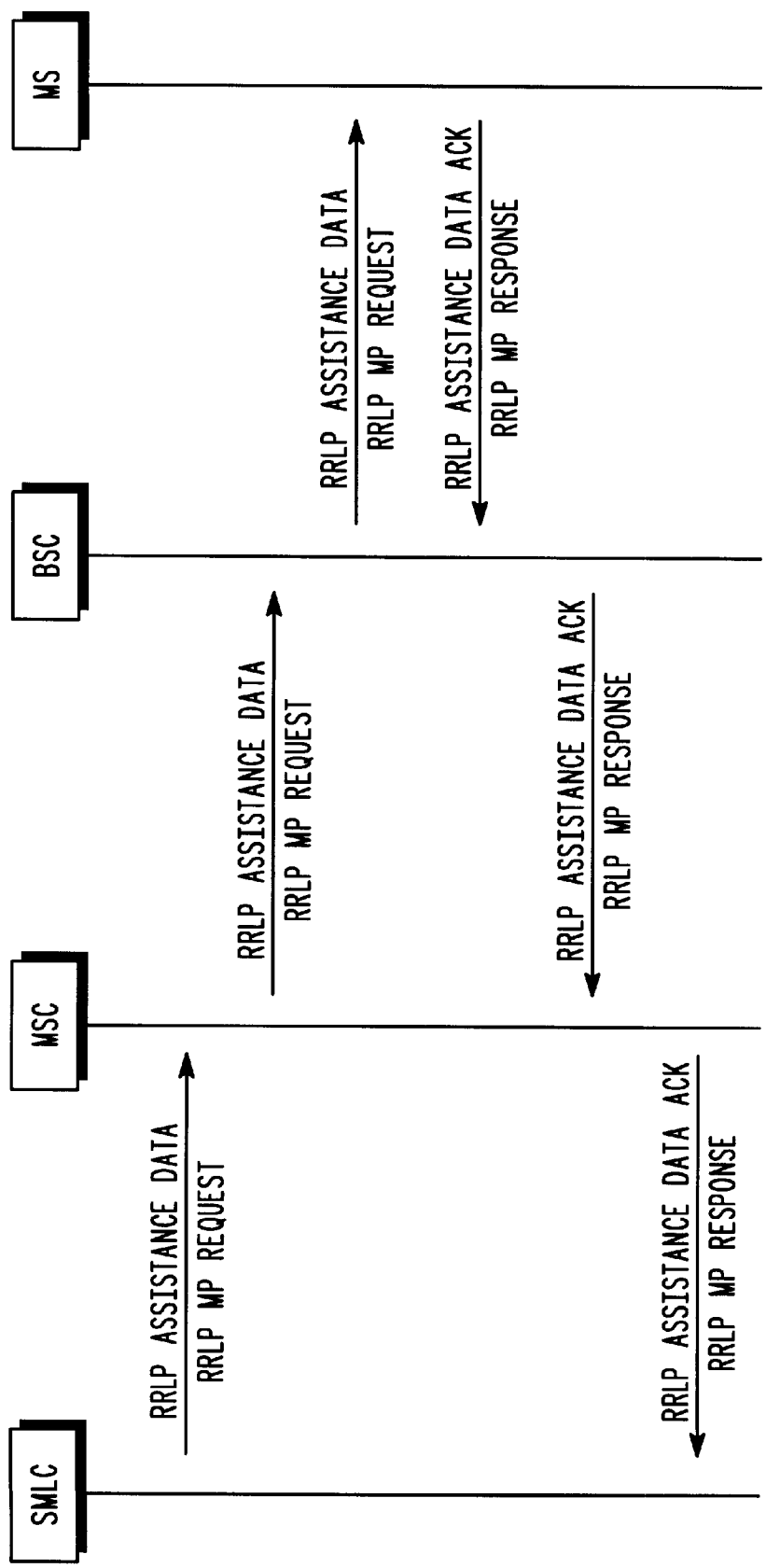
FIG. 20 is a positioning procedures/data flow diagram of data delivery on the Assisted GPS radiotelephone system of FIG. 17 in accordance with the alternate embodiment of the present invention.

Referring next to FIG. 20, in accordance with the alternate embodiment of the present invention discussed herein, there are two data flows shown: positioning procedure flow and assistance data flow. The assistance data delivery flow for all location methods used with the NSS based SMLC 112 of FIGS. 17 and 18 are shown in FIG. 20. Since the location procedures for NSS based SMLC are very similar to the BSS based ones depicted in FIGS. 5 and 6 except the positioning procedure/assistance data flow, one can refer to FIGS. 5 and 6 for the similar steps not shown in FIG. 20. The NSS based SMLC positioning procedure flow consists of: (a) The SMLC determines possible assistance data and sends a RRLP MEASURE POSITION request to MSC and the MSC forwards the RRLP MEASURE POSITION request to the BSC; (b) the BSC sends the positioning request including the QoS and any assistance data to the MS in a RRLP MEASURE POSITION request; (c) provided location privacy is not enabled in the MS, or enabled but overridden to obtain location for an emergency call, the MS performs the requested GPS measurements (If the MS is able to calculate its own location and this is required, the MS computes a GPS location estimate. Any data necessary to perform these operations will be either provided in the RRLP MEASURE POSITION request or available from broadcast sources.)

and the resulting GPS measurements or GPS location estimate are returned to the BSC in a RRLP MEASURE POSITION response; (d) if the MS was unable to perform the necessary measurements, or compute a location, a failure indication is returned instead; (e) the BSC sends measurement results in the MEASURE POSITION response within BSSMAP Location Information Report message to MSC; and (f) the MSC forwards the measurement results in the MEASURE POSITION response within LCS Information Report message to SMLC.

The NSS based SMLC assistance data flow consists of: (a) the SMLC determines assistance data and sends the RRLP ASSISTANCE DATA message to the MSC; (b) the MSC forwards the RRLP ASSISTANCE DATA message to the BSC; (c) the BSC sends the assistance data to the MS in a RRLP ASSISTANCE DATA message (If the assistance data does not fit to one message, the steps (a), (b) and (c) can be repeated.); (d) the MS acknowledges the reception of complete assistance data to the BSC in a RRLP ASSISTANCE DATA ACK; (e) the BSC sends the RRLP ASSISTANCE DATA ACK to the MSC; and (f) the MSC forwards the RRLP ASSISTANCE DATA ACK to the SMLC.

In other aspects of operation, particularly operation at the mobile station 104, the NSS based system operates in the manner described above in regards to the preferred embodiment of the present invention.

A cellular network protocol which supports both broadcast and point-to-point messaging in support of an assisted GPS based positioning for cellular handsets has been specified. It can be seen that the present invention has several advantages over current solutions. For example, the present invention reduces the required traffic flow (bandwidth) between the mobile station and the network, and reduces the complexity of the infrastructure by removing the requirement for intra- and inter-tables, related data structure and algorithms, and intra- and inter-SMLC communication for ephemeris data creation and maintenance. In fact, the analysis discussed hereinabove indicates that traffic flow is reduced by more than 40%, on the average, over similar conventional techniques.

The messages and the methods of control of the present invention represent an improvement over conventional location techniques in that these messages and methods advantageously minimize the required traffic flow in the network. For example, the specified point-to-point ephemeris broadcast method reduces the effective required bit rate by at least 40%. In its point-to-point messages, the protocol can be referred to as a "handset-centric" approach, to distinguish it from conventional "network-centric" approaches. Three specific innovations of the present invention together minimize the number of bits required to be transferred to each handset: a method for reducing or removing the requirement for GPS ephemeris updates to each mobile; a method for controlling the rate at which the network updates each handset's ephemeris based on an ephemeris age limit; and, finally, a method which each mobile can use to determine when an ephemeris update is needed, based on an accuracy prediction and a threshold which is unique to each mobile station.

In ephemeris broadcast messages in accordance with the present invention, three specific novel innovations are also specified: the use of computed position data, in place of ephemeris elements, which reduces the effective bit rate by up to 50%; the absorption of the satellite clock correction data into the broadcast position estimates, to eliminate the need for their separate broadcast; and a method for compression of the differential correction broadcast message, based on the error characteristics of GPS.

Although the invention has been described and illustrated in the above description and drawings, it is understood that this description is by way of example only and that numerous changes and modifications can be made by those skilled in the art without departing from the true spirit and scope of the invention. For example, while the present invention has been presented in the preferred and an alternate embodiment in the confines of a GSM cellular system, the invention could be implemented in other radio communication systems. Therefore, our invention should be limited only by the following claims.

What is claimed is:

1. A method in a mobile radio communication device for determining a location of the mobile radio handset, the method comprising the steps of:

receiving an ephemeris message, wherein said ephemeris message comprises Global Positioning System (GPS) ephemeris data for a plurality of GPS satellites and clock correction data;

thereafter receiving a differential correction message comprising differential correction data;

determining whether the GPS ephemeris data for one or more of the plurality of GPS satellites requires update;

requesting an update message comprising updated GPS ephemeris data;

receiving the update message; and determining the location of the mobile radio handset in response to the GPS ephemeris data, the clock correction data, the differential correction data, and the updated GPS ephemeris data, wherein the step of receiving an ephemeris message comprises the step of receiving a point-to-point ephemeris message particularly addressing the mobile radio handset, the step of receiving a differential correction message comprises the step of receiving a point-to-point differential correction message particularly addressing the mobile radio handset, and wherein the step of determining whether the GPS ephemeris data for one or more of the plurality of GPS satellites requires update comprises the steps of:

calculating a computed location of the mobile radio handset; and determining a prediction of an accuracy of the computed location in response to the computed location, the GPS ephemeris data and a timing parameter.

2. The method of claim 1 wherein the step of determining a prediction of the accuracy of the computed location comprises the step of determining a prediction of the accuracy of the computed location in response to an age of the GPS ephemeris data and a statistical relationship of the age to accuracy of computed locations.

3. The method of claim 1 wherein the step of determining a prediction of the accuracy of the computed location comprises the step of determining a prediction of the accuracy of the computed location based on covariance information derived by a Weighted Least Square (WLS) fixing method.

4. The method of claim 3 wherein the step of determining a prediction of the accuracy of the computed location based on covariance information comprises the step of computing the covariance information by scaling the covariance information with information computed from the residuals of an overdetermined WLS solution.

5. The method of claim 4 wherein said information computed from the residuals is an a posteriori statistic of the unit variance.

6. The method of claim 1 wherein the step of determining a prediction of the accuracy of the computed location comprises the step of determining a prediction of the accuracy of the computed location based on covariance information computed for a Least Square (LS) fixing method.

7. The method of claim 6 wherein the step of determining a prediction of the accuracy of the computed location based on covariance information comprises the step of computing the covariance information by scaling the covariance information with information computed from the residuals of an overdetermined LS solution.

8. The method of claim 7 wherein said information computed from the residuals is an a posteriori statistic of the unit variance.

9. The method of claim 1 wherein the step of determining whether the GPS ephemeris data for one or more of the plurality of GPS satellites requires update further comprises the step of determining whether the prediction of the accuracy of the computed location exceeds a predetermined accuracy threshold for said mobile radio handset.

10. The method of claim 9 wherein the step of determining whether the GPS ephemeris data for one or more of the plurality of CPS satellites requires update further comprises the steps of:

determining whether the GPS ephemeris data for one or more of the plurality of GPS satellites is old; and determining additional accuracy predictions of the computed location based on hypothesized updated GPS ephemeris data for the one or more satellites for which the ephemeris data is old.

11. The method of claim 1 wherein said step of determining whether the GPS ephemeris data for one or more of the plurality of GPS satellites requires update comprises the step of determining an ephemeris age limit previously communicated to said cellular infrastructure has been exceeded.

12. The method of claim 1 wherein the differential correction data has been derived from satellite positions computed using the GPS ephemeris data previously received by the mobile radio handset.

13. The method of claim 1 wherein the differential correction data has been derived by adjusting the clock correction values for an ephemeris age of the GPS ephemeris data.

14. The method of claim 1 wherein the step of receiving a differential correction message comprises the step of receiving a broadcast differential correction message addressing more than one mobile radio handset broadcast at a first transmission rate.

15. The method of claim 14 wherein the step of receiving a broadcast differential correction message comprises the step of receiving a broadcast differential correction message including correctional data for multiple ephemeris sets.

16. The method of claim 15 wherein the correctional data is calculated as a set of delta correction values.

17. The method of claim 16 wherein the set of delta correction values are each computed successively, wherein each of the set of delta correction values represents a correction difference with a prior ephemeris value.

18. The method of claim 16 wherein the set of delta correction values are received at a second transmission rate, wherein the second transmission rate is less than the first transmission rate.

19. The method of claim 16 wherein the set of delta correction values are compressed based upon RTCM standard.

20. The method of claim 16 wherein the set of delta correction values are alternated in successive broadcast differential correction messages to reduce a length of the broadcast differential correction messages.

21. The method of claim 1, wherein the step of receiving an ephemeris message comprises the step of receiving a broadcast ephemeris message addressing more than one mobile radio handset.

22. The method of claim 21 wherein the differential correction data of the differential correction message has been derived from positions of the plurality of GPS satellites using the ephemeris data of the broadcast ephemeris message.

23. The method of claim 21 wherein the differential correction data of the differential correction message has been derived by adjusting previously received differential correction data in response to the clock correction data.

24. The method of claim 21 wherein the GPS ephemeris data of the broadcast ephemeris message comprises a position of one of the plurality of GPS satellites and a velocity of the one of the plurality of GPS satellites during an interval equivalent to a length of the broadcast ephemeris message.

25. The method of claim 21 wherein the GPS ephemeris data of the broadcast ephemeris message comprises two or more sets of a position of one of the plurality of GPS satellites and a velocity of the one of the plurality of GPS satellites during an interval equivalent to a length of the broadcast ephemeris message.

26. The method of claim 1, wherein the step of receiving an ephemeris message comprises the step of receiving a broadcast ephemeris message addressing more than one mobile radio handset, and wherein the step of receiving a differential correction message comprises the step of receiving a broadcast differential correction message addressing more than one mobile radio handset.

* * * * *

UNITED STATES PATENT AND TRADEMARK OFFICE
CERTIFICATE OF CORRECTION

PATENT NO. : 6,313,787 B1
DATED : November 6, 2001
INVENTOR(S) : King et al.

It is certified that error appears in the above-identified patent and that said Letters Patent is hereby corrected as shown below:

Claim 10,
Line 23, change "CPS" to -- GPS --

Signed and Sealed this

Twelfth Day of March, 2002

Attest:

JAMES E. ROGAN
Attesting Officer
Director of the United States Patent and Trademark Office